(12) United States Patent
Munoz et al.

(10) Patent No.: US 11,330,033 B2
(45) Date of Patent: *May 10, 2022

(54) STREAMING AND NONSTREAMING MEDIA TRANSFER BETWEEN DEVICES

(71) Applicant: Mass Luminosity, Inc., Dallas, TX (US)

(72) Inventors: Angel Munoz, Dallas, TX (US); Teodor Atroshenko, Sao Marcos (PT)

(73) Assignee: Mass Luminosity, Inc., Lake Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/145,865

(22) Filed: Jan. 11, 2021

(65) Prior Publication Data

US 2021/0136137 A1 May 6, 2021

Related U.S. Application Data

(63) Continuation of application No. 16/836,812, filed on Mar. 31, 2020, now Pat. No. 10,893,087.

(60) Provisional application No. 62/903,829, filed on Sep. 21, 2019.

(51) Int. Cl.
| | |
|---|---|
| H04L 65/1069 | (2022.01) |
| H04L 65/1096 | (2022.01) |
| H04L 65/1093 | (2022.01) |
| H04L 65/65 | (2022.01) |
| H04L 51/224 | (2022.01) |
| H04L 67/563 | (2022.01) |
| H04L 65/61 | (2022.01) |
| H04L 51/58 | (2022.01) |
| H04W 76/20 | (2018.01) |

(52) U.S. Cl.
CPC ............ *H04L 65/608* (2013.01); *H04L 51/24* (2013.01); *H04L 51/38* (2013.01); *H04L 65/4069* (2013.01); *H04L 67/2814* (2013.01)

(58) Field of Classification Search
USPC ........................................................ 709/231
See application file for complete search history.

(56) References Cited

U.S. PATENT DOCUMENTS

| | | | |
|---|---|---|---|
| 6,578,066 B1 | 6/2003 | Logan et al. | |
| 6,633,761 B1 | 10/2003 | Singhal et al. | |
| 7,296,091 B1 * | 11/2007 | Dutta ..................... | H04L 29/06 709/244 |
| 8,254,986 B2 * | 8/2012 | Russell ............. | H04W 36/0066 455/552.1 |
| 10,812,974 B2 | 10/2020 | Mu et al. | |
| 10,893,087 B1 * | 1/2021 | Munoz ................ | H04L 65/1083 |

(Continued)

*Primary Examiner* — Jude Jean Gilles
(74) *Attorney, Agent, or Firm* — Ferguson Braswell Fraser Kubasta, PC

(57) ABSTRACT

A method for streaming and nonstreaming media transfer between devices includes receiving, by a server, a request message for a handoff of content from a first device displaying the content to a second device. The method further includes generating a handoff protocol for the handoff in response to the handoff request message. The method further includes transmitting, to one of the first device and the second device, a first notification message that includes a plurality of handoff parameters, based on the handoff protocol, that identifies an algorithm for the handoff of the content. The content is displayed with the second device after the handoff is complete.

20 Claims, 18 Drawing Sheets

(56) References Cited

U.S. PATENT DOCUMENTS

| | | |
|---|---|---|
| 2003/0129981 A1 | 7/2003 | Kim |
| 2007/0140173 A1 | 6/2007 | Tomizu |
| 2012/0239725 A1 | 9/2012 | Hartrick et al. |
| 2014/0095592 A1 | 4/2014 | Hartrick et al. |
| 2014/0156854 A1* | 6/2014 | Gaetano, Jr. ........ H04L 65/1086 709/227 |
| 2015/0245259 A1* | 8/2015 | Marcum ......... H04W 36/00837 455/437 |

* cited by examiner

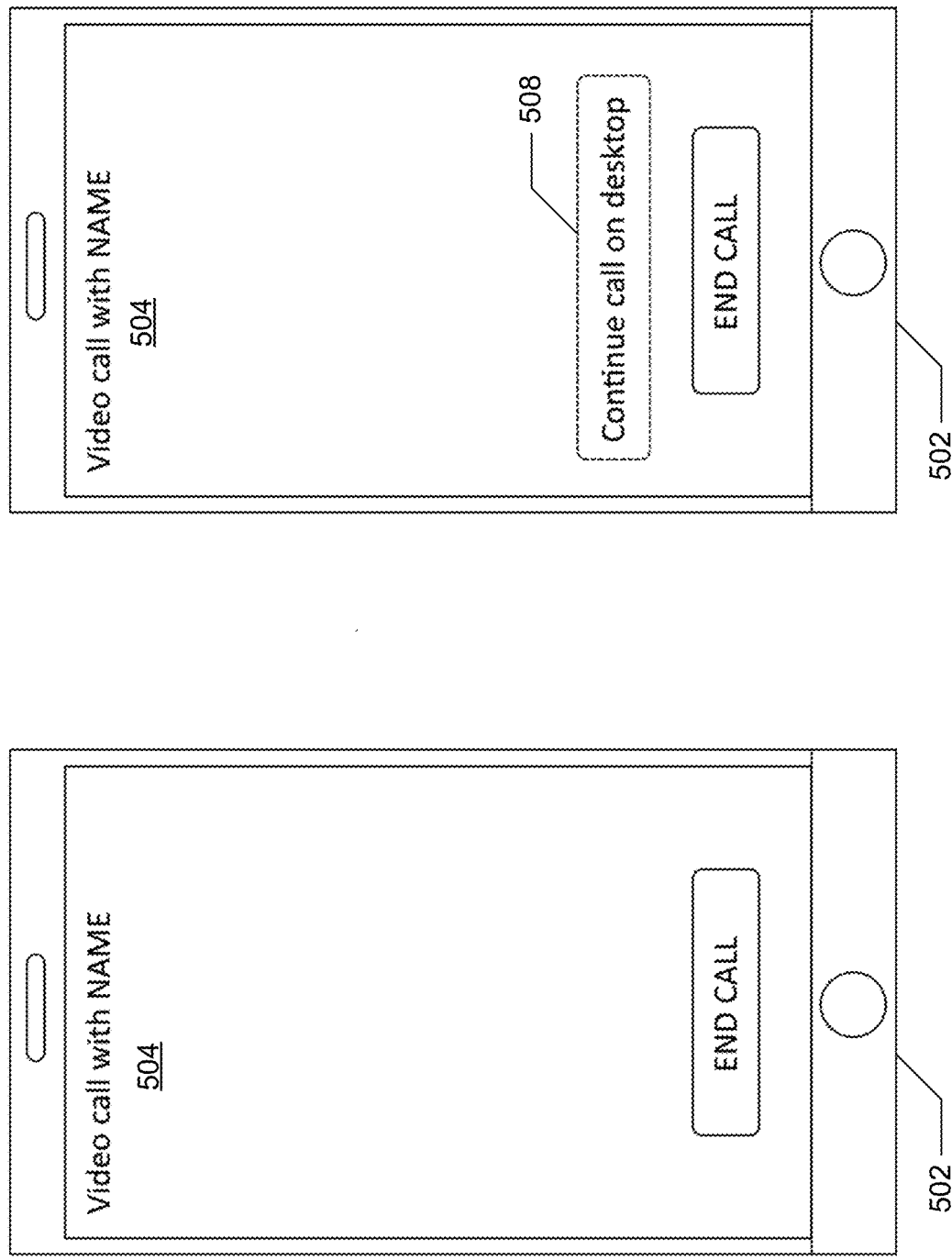

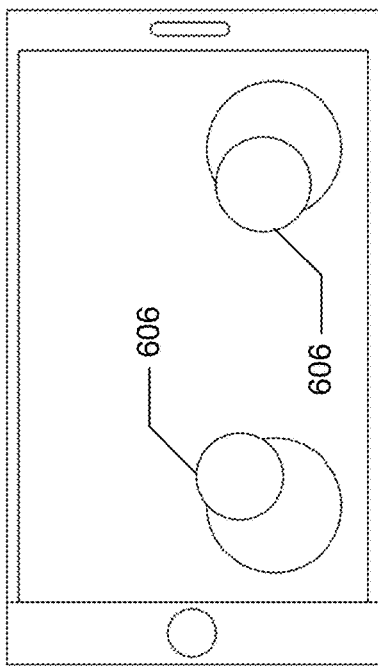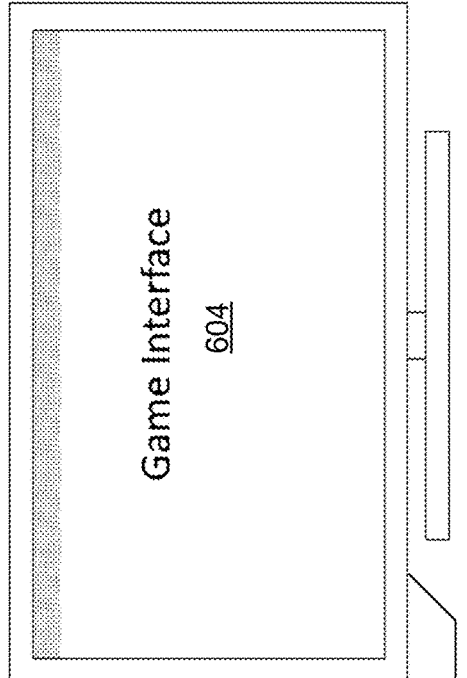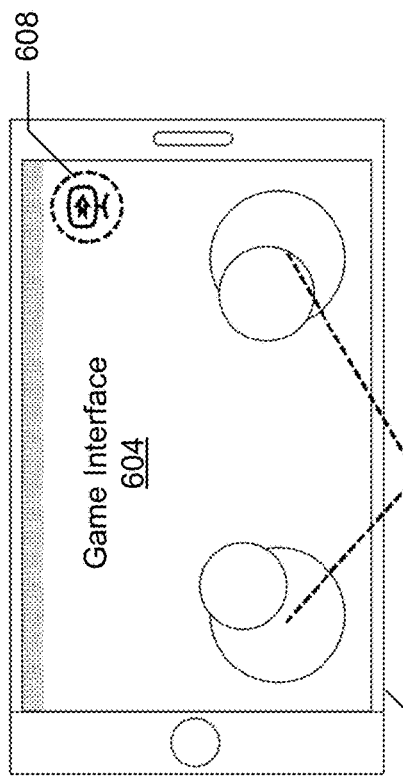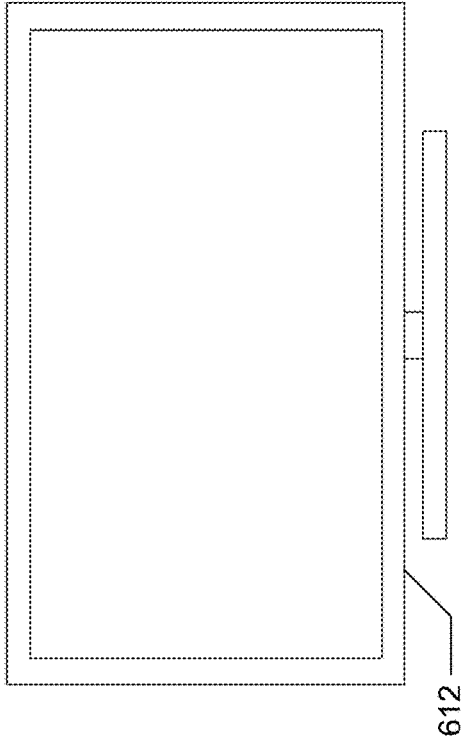
FIG. 6

802

812

Video Call
804

STREAMING AND NONSTREAMING MEDIA TRANSFER BETWEEN DEVICES

CROSS-REFERENCE TO RELATED APPLICATIONS

This application is a continuation in part of U.S. application Ser. No. 16/836,812, filed on Mar. 31, 2020, which claims the benefit of U.S. Provisional Application No. 62/903,829, filed Sep. 21, 2019. Each of the applications identified above are incorporated herein by reference in their entirety.

BACKGROUND

Currently, media such as streaming and/or downloaded videos are played on a specific user device. However, when a user wants to view the media on another device, the options are limited. The user can load the streaming video on a second device by, for example, logging into the associated website, select the media item, and rejoining the delivery of the streaming video. As another example, a user can pause a video being viewed on a first device, logging into the associated website on a second device, select the media item, and either fast forward to the same or similar position or rely on the content provider to "remember" the time in the video at which it has been paused on the first device (e.g., via the use of cookies on the device and/or tracking on the website). As another example, a user having a conversation on their mobile phone with second user can hang up the call, launch a messaging application on their laptop, find second user in messaging application contacts, open contact details of the second user, and press the dial button to initiate a new voice call on the second device, then wait until second user answers the call. These solutions fail to deliver seamless viewing experiences. In increasingly flexible work and recreation spaces, the lack of a seamless viewing experience can decrease user enjoyment (e.g., as media and/or games are paused; as games are forced to continue on a first device for fear of missing action in live games, etc.) and/or productivity.

SUMMARY

In general, in one aspect, one or more embodiments relate to a method that includes receiving, by a server, a request message for a handoff of content from a first device playing the content to a second device. The method further includes generating a handoff protocol for the handoff in response to the handoff request message. The method further includes transmitting, to one of the first device and the second device, a first notification message that includes a plurality of handoff parameters, based on the handoff protocol, that identifies an algorithm for the handoff of the content. The content is displayed with the second device after the handoff is complete.

Other aspects of the invention will be apparent from the following description and the appended claims.

BRIEF DESCRIPTION OF DRAWINGS

FIG. 5A, FIG. 5B, FIG. 6A, FIG. 6B, FIG. 6C, FIG. 6D, FIG. 7A, FIG. 7B, FIG. 7C, FIG. 7D, FIG. 8A, FIG. 8B, FIG. 8C, FIG. 8D, FIG. 9A, FIG. 9B, FIG. 9C, FIG. 9D, FIG. 10A, FIG. 10B, FIG. 10C, and FIG. 10D show examples in accordance with disclosed embodiments.

DETAILED DESCRIPTION

Figure 1:
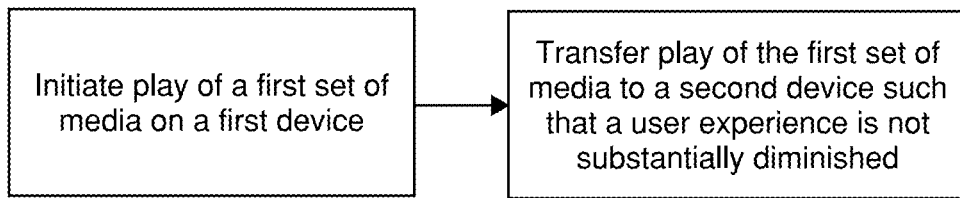
FIG. 1 illustrates an implementation of an example method for transferring media between devices.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In various implementations, content may be handed off between user devices. Content may include video content, audio content, and gaming content in the form of streaming or non-streaming media or files that include video (e.g., a graphics interchange format (GIF) file converted to video format with no audio, a video with one or more audio tracks from an online video-sharing platform, etc.), music, games (e.g., game content in general, including the visual interfaces, audible interfaces, control interfaces (gamepad and touchscreen inputs), etc., including cutscenes that are part of gameplay, but which may not be part of a game interface), calls (e.g., audio and/or video, cellular and/or voice over internet protocol (VoIP), etc.), and/or any other appropriate content including non-streaming media content (e.g., "file on disk", downloaded content playback, such as music and videos). The Media Manager may monitor and/or control the handoff between the user devices. For example, the Media Manager may determine the appropriate time and/or manner in which to terminate play of content on a first device and begin play of content on a second device. The handoff may be initiated by a device that is playing the content to be handed off and/or by a device where the content from another device should continue playing (e.g., to draw content to the device). The handoff may not require user input on both devices (e.g., a user may provide a handoff gesture on the device that initiates the handoff and not provide user input on the other device). The handoff may provide a seamless transition of the content play as it transitions from playing on a first device to playing on a second device, which may increase user satisfaction in the devices and/or content.

As user devices have merged in computing capabilities, the lack of seamless streaming between devices has become a greater burden on user enjoyment of content and user productivity. For example, users commonly take a call (e.g., audio and/or video) on a first device but would prefer to transfer the call to a second device (e.g., when coming into the office, when leaving the office, when arriving home, when arriving at a location in which sharing the content would be beneficial, when sitting down at a desk, when going to a different room, etc.). As another example, users may start streaming media on a first device (e.g., watch gaming action on a mobile device on public transportation) but want to transfer the media to a second device (e.g., a television or a laptop) upon arriving at a destination. The system and operations of the Media Manager may facilitate the seamless transfer or handoff of the content (e.g., interactive media, streaming media, previously recorded media, etc.) from a first user device to another user device.

A seamless handoff is a handoff between devices with unperceivable transitional phase when both devices may be playing back content. The transitional phase may be perceivable with de-synchronized audio playback (one device playing audio track at a significantly different position than the other device; significant difference would be anything larger than 15 milliseconds), de-synchronized video playback (one device playing video track at a significantly different position than the other device; significant difference would be anything larger than 75 milliseconds), among others.

Statistics on how well handoff performed for the given system state and the media parameters are gathered through the media playback reports sent from the app to Media Manager server upon significant media state changes (e.g., playing, paused, ended) which are sent to the server together with the media state snapshot timestamp. The time deviation is calculated from the expected time when the media playback had to begin or end according to selected handoff strategy. As shown in Equation 1 below, time deviation (TD) is calculated by subtracting the received media state snapshot timestamp (TS) from the expected time calculated by adding the handoff transition duration (D) to startTimeLocal (STL) (both numbers are in the reference format of the clock of the device).

$$TD=TS-(STL+D) \quad (Eq.1)$$

In various implementations, play of a first set of media may be initiated on a first user device, as illustrated in the process 100 of FIG. 1, and the play may be transferred or handed off to a second device such that a user experience is not substantially diminished. A Media Manager may facilitate this handoff by monitoring information related to the user device(s) and/or content, making handoff operations possible on user devices, and/or providing instructions for devices to facilitate the handoff of media play. Unlike merely handing off an audio and/or video stream via Bluetooth, the media play on the first device may be fully or partially terminated (e.g., audio play ends, while video play continues), without substantially impacting the overall media play, to the second device via the handoff.

Figure 2:
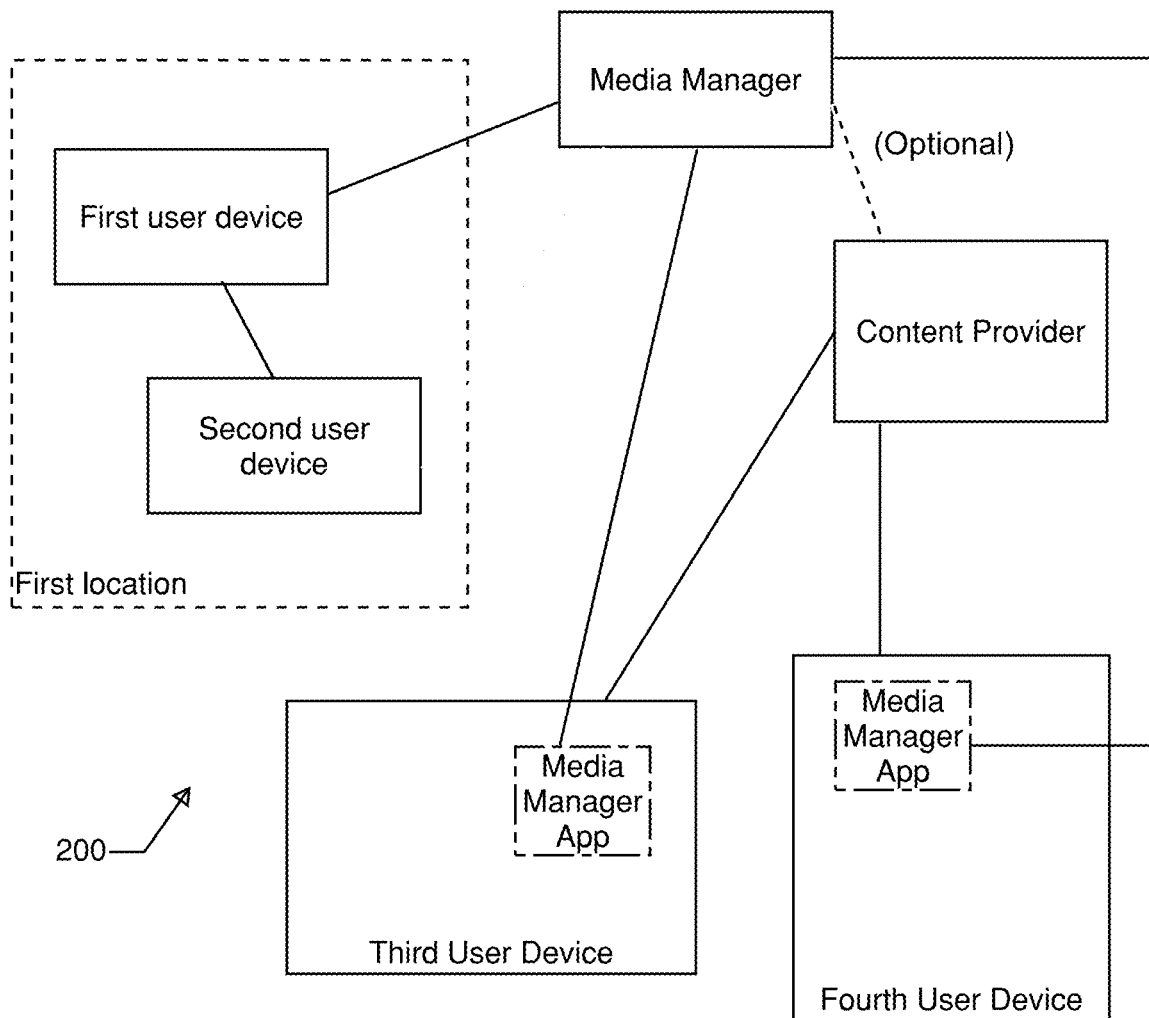
FIG. 2 illustrates an implementation of an example system capable of transferring media between devices.

FIG. 2 illustrates an implementation of the system 200 that includes the Media Manager and that is capable of performing operations such as, but not limited to the operations described in FIG. 1. FIG. 2 illustrates the interaction of the Media Manager with a first user' s devices, as an implementation of how the Media Manager may interact with a plurality of users and/or devices. As illustrated, a first user may have more than one device (e.g., first, second, third, fourth, fifth, etc. user devices). Each device may be a different or the same type of computing device. For example, the first user device may be a laptop and the second user device may be a television (e.g., with internet access). The third and fourth user device may be a cell phone and the fifth user device may include a tablet computer. The user devices may be communicably couplable to the Media Manager. For example, the first user device may be communicably coupled to the Media Manager via a web browser of the internet, the second user device may be communicably coupled to the Media Manager via the first user device, the third user device may be communicably coupled to the Media Manager via a Content Provider, while the fourth and fifth user devices may be communicably coupled via a Media Manager Application on the user devices. The user devices may be coupled to a Content Provider directly and/or indirectly via the Media Manager. For example, the user devices may present content (e.g., streaming media, downloaded media, pre-recorded media, live media, audio calls, video calls, etc.) provided by the Content Provider. As another nonlimiting example, the user devices may also stream content back to a Content Provider at the same time (e.g., streaming media, live media, game inputs, audio calls, video calls, etc.).

As illustrated, a first user may have more than one device coupled to the Media Manager and thus may be capable of handing off content play between the devices. When the first user requests play of first content from the content provider on the first user device, the first user device may access the content from the Content Provider via the Media Manager and/or directly. Since the first user device is at a first location, which also is proximate the second user device, the Media Manager may allow handoff of the first content to the second user device. The Media Manager may inhibit handoff of the first content from the first user device to the third and/or fourth user device, since these devices are not proximate the first user device and/or the first location (e.g., at the first location). By inhibiting handoff to user devices that are not proximate the first user device (e.g., the device playing the content), the Media Manager may inhibit accidental handoff to remote device which may decrease the first user's enjoyment of the content (e.g., since the first content may play and be unviewable by the first user, since the first user may miss portions of the action and/or call in live content play, etc.). Remote hijacking may be inhibited by inhibiting handoff to user devices that are not proximate the first user device (e.g., the device playing the content). For example, if a device must be proximate, a user may be more aware of another device receiving a handoff in an unauthorized manner. As another nonlimiting example, remote hijacking may be inhibited by only allowing a handoff to a remote device (e.g., a device with undetermined location) when user intent can be deemed to be legitimate. For example, user intent may be legitimate when the user accessing the device has entered the device unlock code. As another example, user intent may be legitimate when a device is a smartphone that is typically held in personal possession, is not shared among multiple users, and is therefore deemed to be used only by the owner. Additionally, a handoff request can be verified by other means such as using STIR/SHAKEN (Secure Telephony Identity Revisited/Secure Handling of Asserted information using Tokens) protocols and information for handoff requests made by dialing a designated phone number.

On devices without a satellite positioning service (e.g., global positioning satellite (GPS) service) or other positioning service, or if the user had turned off the positioning services or had rejected the permission request for the app to have access to precise location of the device, the application falls back to geo-location from the IP address. The Media Manager accesses databases that map IP addresses to location coordinates (e.g., GPS coordinates) and error radius to give an approximate location of the user device. When the positioning service is available on the device, the system API is used to request the coordinates and error radius of the device. When a handoff request is made via a phone call, approximate location of the device may be obtained by using ALI (Automatic Location Identification) and/or DBH Location (Device-based Hybrid Location) technologies and protocols.

The positioning data is used to determine if the two devices are nearby: they either share the same IP address, or they are both within approximately the same region based on their (estimated) location coordinates, for example within 50 meters for devices that are to be connected using a Bluetooth connection (e.g., Bluetooth speakers), 100 meters for devices that are to be connected using a Wi-Fi hub (e.g., smart speakers) and 250 meters for devices that have independent internet connection (e.g., TV, smartphone, laptop) or may be using a connection other than an internet connection for accessing content (e.g., a cell phone dialing a designated number).

Figure 3A:
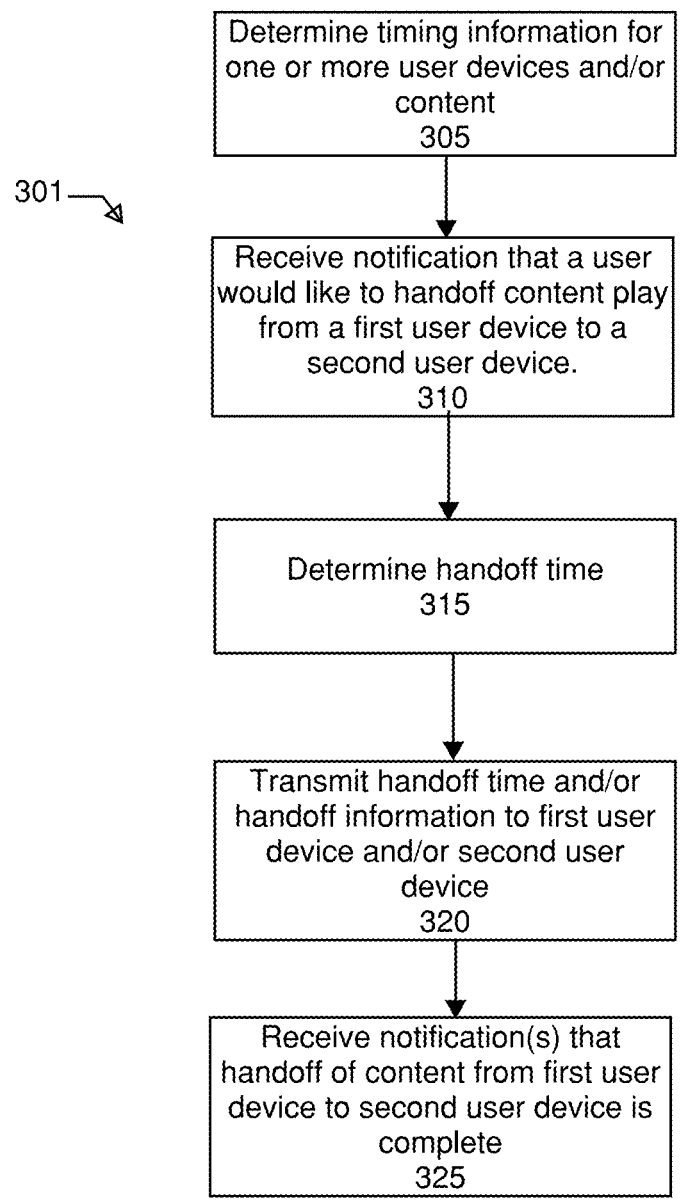
FIG. 3A illustrates an implementation of an example process for handing off content play between devices.

In various implementations, the Media Manager manages content handoff by monitoring user devices and/or content play. FIG. 3A illustrates an implementation of an example process 301 for managing handoff of content play between devices. User devices may be utilized to present content (e.g., media items) to users. The user device may access the content from a Content Provider directly from the Content Provider and/or via the Media Manager (e.g., an interface generated by the system and/or by the Media Manager). The Media Manager may monitor user devices (e.g., user devices sending notifications to Media Manager, Media Manager monitoring content play that it facilitates to user devices, Media Manager communicating with Content Providers to obtain content play status on user devices, etc.) and use information obtained from monitoring to control and/or facilitate the handoff of content play to another device. For example, timing information for one or more user devices may be determined (operation 305). The Media Manager may request timing information from user devices such as device time (e.g., timestamp on a device; UNIX Epoch time; time zone, etc.) and determine how long the user device takes to respond to the timing request (e.g., network delay such as round trip time, RTT; processing time). The Media Manager may determine time information for a handoff (e.g., potential and/or impending) based on the received device time and RTT. In some implementations, Media Manager may obtain RTT and/or other timing information (e.g., audio propagation delay, audio buffer size, etc.) from a Content Provider (e.g., using a Content Provider API, using Content Provider published data sheets, etc.).

A notification may be received (operation 310) from a first user device that the first user would like to handoff content to a second user device. The first user device may be communicably coupled to the Media Manager. The Media Manager may determine locations of the first, second, and/or other user devices associated with the first user and allow a handoff function between proximate devices associated with the first user. For example, a handoff function may be available between devices within a predetermined boundary (e.g., designated as at home), within a predetermined distance from each other (e.g., 50 feet), and/or any other appropriate designation. The Media Manager may identify one or more user devices that are proximate and allow a handoff feature to be available. The device and/or the Media Manager App may use graphical user interface generated by the Media Manager (e.g., presented on the user device) and/or device to indicate a handoff feature is available. A user may then select the handoff feature. For example, the selection of the handoff feature may include selection of a button (e.g., button on GUI, button on attached input device, and/or physical button), a slider (e.g., on a GUI and/or physical slider), a voice command, a text command, a finger gesture, a hand gesture, etc. As another nonlimiting example, user actions may activate the handoff feature (e.g., actions sensed by in-device sensors and/or other appropriate actions, including dialing a designated phone number, opening a URL in a web browser, etc.). In some implementations, a user action could include lifting a user device off a table, setting the user device at rest (e.g., on a dock station, on a table, on a countertop), connecting and/or disconnecting a device charger, connecting and/or disconnecting an audio output (e.g., headphones, speakers, headset, sound card, etc.), connecting and/or disconnecting a video output (e.g., projector, monitor, etc.), setting the device in motion (e.g., shaking the device; changing the device orientation), and/or combinations thereof. In some implementations, a user action could include bringing the device into and/or out of the range of wireless networks (e.g., Wi-Fi; Bluetooth; NFC; Zigbee; cellular, etc.), wireless devices (e.g., Bluetooth speaker system, car Bluetooth system, NFC device, etc.), and/or combinations thereof. In some implementations, a user action could include starting and/or ending a game level, starting and/or ending stage, pausing and/or resuming a game, interacting with an in-game object (e.g., button, lever, switch, pulley, etc.), interacting with NPC (e.g., Non-Playable Character), leaving and/or entering an area in the game (e.g., stage, level, building, vehicle, etc.), and/or combinations thereof.

A handoff time may be determined (operation 315), in response to receiving the request for a handoff. The Media Manager may determine the handoff time based at least partially on the determined information. A handoff time may be selected (e.g., in the future), but if the time is not selected far enough in the future, the user devices may not be capable of being responsive. For example, the Media Manager may use the network delay or RTT to determine the handoff time. Since there is a delay between a command being sent and received (e.g., network delay or approximately half the RTT), the handoff time must be far enough in the future such that the handoff procedure can be executed by the handoff time. In some implementations, if a time used by a device is incorrect, the user device may not be capable of being responsive to the handoff time. For example, while many user devices include UNIX Epoch time as a timestamp, in some implementations, a user device may have an incorrect timestamp and/or a timestamp outside a predetermined tolerance which might cause the Media Manager and the user device to have dissimilar times (e.g., which may make seamless handoff difficult). Thus, the Media Manager may determine a time difference between the Media Manager time (e.g., server time) and a user device such that the time difference can be accounted for in the determination of the handoff time. In some implementations, the handoff time may include a determination of how much time the user device (e.g., the specific user device and/or a generic representation of a user device) needs to follow the handoff procedure. This time may be incorporated into the handoff time such that the user device has enough time to follow the handoff procedure in relation to the second user device.

The handoff time (e.g., a time to transfer control and/or presentation of content from a first device to the second device) and/or handoff procedure may be transmitted to the first user device and/or the second user device (operation 320). In some implementations, the handoff procedure may be stored on the user device; and thus, the handoff procedure may not be transmitted from the Media Manager. The handoff procedure may include a series of operations and/or order of operations to be performed in order to handoff media content play and/or control to another user device. For example, the handoff procedure for a user device going from an active stage (e.g., playing content) to a passive stage (e.g., stop playing content) may include reduction in audio volume and/or image brightness; transmitting a message to the Content Provider to stop transmission of content; and/or termination of allowing control of play. For example, the handoff procedure for a user device going from a passive stage (e.g., not playing content) to an active stage (e.g., playing content) may include transmitting a message to a Content Provider (e.g., directly and/or via the Media Manager) to transmit content (e.g., identifying which content is to be provided and/or a stoppage point in the content being played on the first user device); increase in audio volume and/or image brightness; and/or transfer of control of the content play (e.g., in gaming, media play, etc.).

The first user device and the second user device may follow the appropriate handoff procedures such that the first user device ceases play of the content and the second user device commences. A notification may be received that the handoff of the content from the first user device to the second user device is complete (operation 325). For example, when the first user device switches from an active stage (e.g., playing content) to a passive stage (e.g., ready to play content), the first user device may transmit this status information (e.g., separately and/or together with timing information).

Figure 3B:
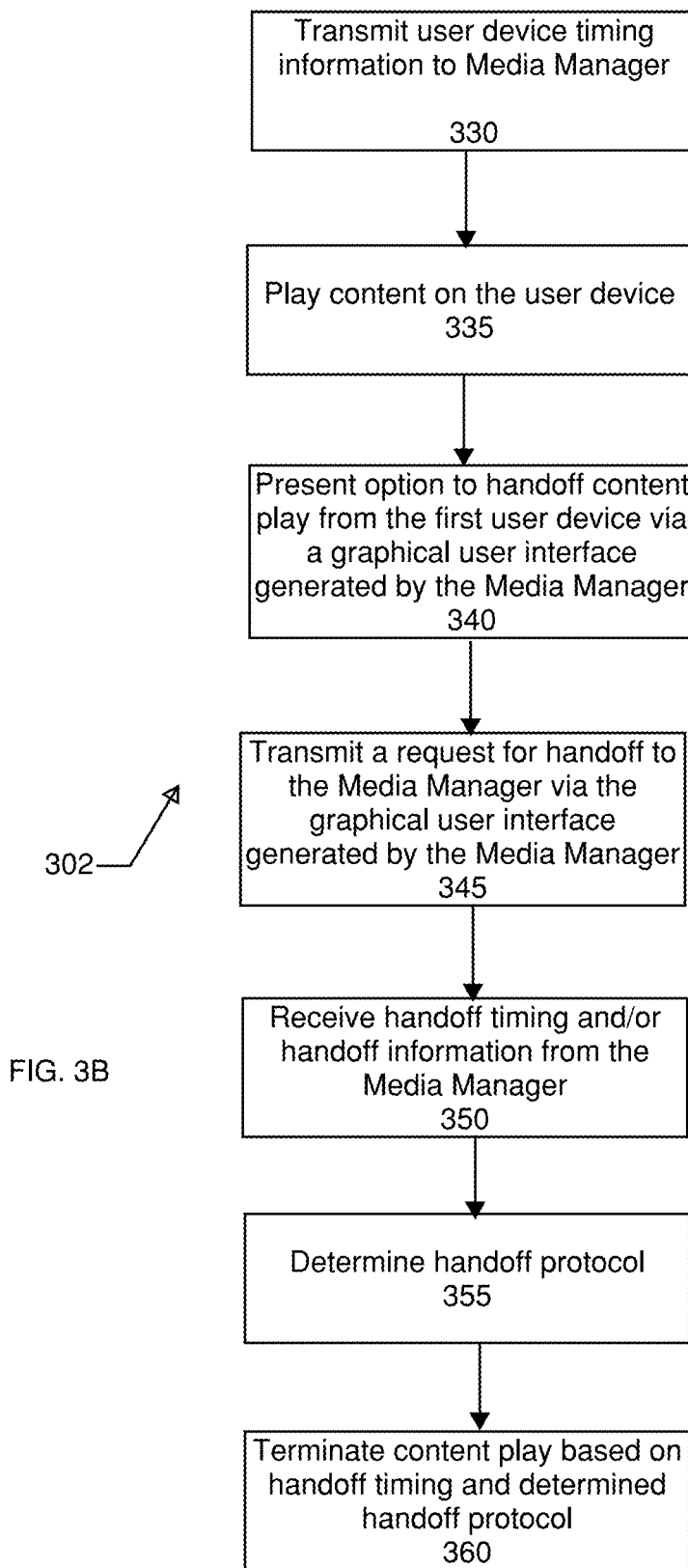
FIG. 3B illustrates an implementation of an example process for handing off content play from a user device.

On the user device side, a user device may perform various operations to ensure that the Media Manager receives the appropriate information such that the handoff operation is possible and/or successful. FIG. 3B illustrates an implementation of an example process 302 for handing off content play. A user device may be associated with a user (e.g., via login information, device information, Caller ID (identification) information together and/or separate from STIR/SHAKEN information etc.) and/or may be communicably coupled with the Media Manager. A user device may transmit timing information to the Media Manager (operation 330). The timing information may include the device timestamp, status of the device and/or devices connected to it (e.g., active and/or passive), user information (e.g., user identification information such that other devices associated with the user may be identified), etc. Device identifying information and/or status may be transmitted to the Media Manager with the timing information and/or via another device and/or Content Provider communicably couplable to the Media Manager. In some implementations, information (e.g., timing, status, content information, etc.) may be transmitted periodically and/or upon change (e.g., in status, content being played, location, etc.).

Content (e.g., calls, interactive media, non-interactive media, etc.) may be played on the user device (operation 335). The content may include audio, image, and/or tactile (e.g., vibration) components. The content may be provided by a Content Provider (e.g., gaming platform; live streaming platform such as Twitch; video provider such as YouTube; and/or any other appropriate platform). The content may be played on the user device via the Media Manager. For example, the Media Manager may be accessible via a webpage (e.g., graphical user interface generated by the Media Manager) on the user device and a user may select content to play via the webpage generated by the Media Manager. For example, the Media Manager may reside at least partially on the user device such as via a Media Manager Application, and a user may select content to be played via the Media Manager Application. As another example, content may be played on the user device directly (e.g., TV program played on television, voice and/or audio call on cell phone), while the device is connected to the Media Manager via another user device and/or directly.

An option to handoff content being played on the user device may be presented via a graphical user interface generated by the Media Manager (operation 340) and/or Media Manager Application. For example, a button may be selectable on the graphical user interface of the Media Manager Application, a notation may be presented via the graphical user interface generated by the Media Manager that user input (e.g., audio and/or tactile commands) may be received, etc. The Media Manager may monitor the user device (e.g., via notifications sent by the user device), other user devices, timing information, etc. and determine whether handoff is possible and allow the option to initiate handoff when the determination is made that it is possible. The Media Manager may inhibit presentation of the option to handoff content when another user device is not available to receive a handoff, when Media Manager does not recognize the user (e.g., the user does not have associated devices and/or log on credentials), when the content is not available for handoff (e.g., too little content left to play to allow a handoff, content Providers does not allow handoff, content is not presented via the Media Manager graphical user interface, the user device settings do not allow Media Manager to control and/or track content play on the user device, and/or combinations thereof), when Media Manager determines handoff to be unsafe to perform (e.g., handoff of music to device with external speakers set to maximum volume can damage hearing), etc.

A request for handoff may be initiated from the user device (e.g., via the graphical user interface; via the user device such as via buttons and/or sliders; via user actions such as lifting a device; via dialing a designated phone number; via opening a URL in a web browser, etc.) and transmitted to the Media Manager (operation 345). For example, a user may select a button that indicates that handoff is desired. As another example, a user may make a verbal command and/or gesture to indicate that handoff is desired. The user device and/or the Media Manager operating on the user device may have access to the user device in a way such that the commands may be received (e.g., camera access to receive gestures via the app, tactile detection access via the app to receive touch commands, game SDK integration to get notified about in-game actions and/or changes, etc.). In some implementations, the request for handoff may include information about the content being played (e.g., time position in a video, login information for a restricted access streaming feed, intercept information for a call, etc.).

The request for handoff may be transmitted without being via the graphical user interface generated by the Media Manager. Different applications on the user device may be used. For example, a phone dialer application may be used to dial into a conference call, a web browser application may be used to open a URL (Uniform Resource Locator), etc. As an example, a user may use the user device to dial into a conference call (e.g., a VoIP call) and the request for handoff is generated by the Content Provider (the VoIP call server) that receives the dial in request from the user device. After receiving the dial in request from the user device, the Content Provider may include the Caller ID (identification) information in the request for handoff to the Media Manager.

The handoff timing and/or handoff information generated by the Media Manager may be received by the user device (operation 350). The handoff timing may include a time to begin a handoff protocol and/or a time at which the handoff protocol should be completed. The handoff timing may ensure that the handoff of content between two devices is seamless (e.g., does not substantially inhibit presentation of the content) to the user. The handoff information may include content specific instructions, device specific instructions, network specific instructions, etc. related to the handoff procedure. In some implementations, the handoff timing and/or handoff information may be generated on user device(s) (e.g., via a Media Manager Application and/or via other applications on the user device). The Media Manager may generate and transmit timing information to the user device and the user device may generate handoff time and/or handoff information, in some implementations. For example, a second user device may receive information that the first device has begun play of first content at a first time. A stored handoff protocol may be retrieved by the second user device such that the second user device initiates handoff without receiving instructions (e.g., after conformation from Media Manager that it received an intention to start a handoff).

The handoff protocol may be determined (operation 355). For example, the handoff protocol may be received by the user device from the Media Manager and/or retrieved from a memory accessible to the user device. The handoff protocol may include a set of operations and an order of the operations according to which the user device may cease play of content, in some implementations. For example, the handoff protocol may include whether the ceasing of play is performed component based (e.g., audio, visual, control vs. play, etc.) and/or overall (e.g., cease entire play of content). For example, the handoff protocol may include whether volume is reduced (e.g., gradually, how gradually, abruptly, etc.), whether image play is faded, when control (e.g., for interactive media and/or calls) is transferred, etc. The handoff protocol may be based on the type of content played (e.g., interactive, audio only, pre-recorded, live, downloaded, streaming, etc.), network latency, type of device, and/or any other appropriate factor that may impact content play experience for a user.

The content play may be terminated based on the handoff timing and the handoff protocol (operation 360). The user device may cease playing the content previously played due to the handoff, and another user device may be playing the same content (e.g., same media type, same participants in the call, same location in the game, etc.) instead. Thus, the handoff may be completed, and the user device may switch from an active state (e.g., playing content) to a passive state (e.g., not playing content).

The user device may indicate the state change to the Media Manager. The Media Manager may or may not monitor the user device in the passive state. In some implementations, the Media Manager may monitor locations of user devices to allow handoffs, but may not monitor timing information, content information, and/or other attributes of the device in the passive state.

Figure 3C:
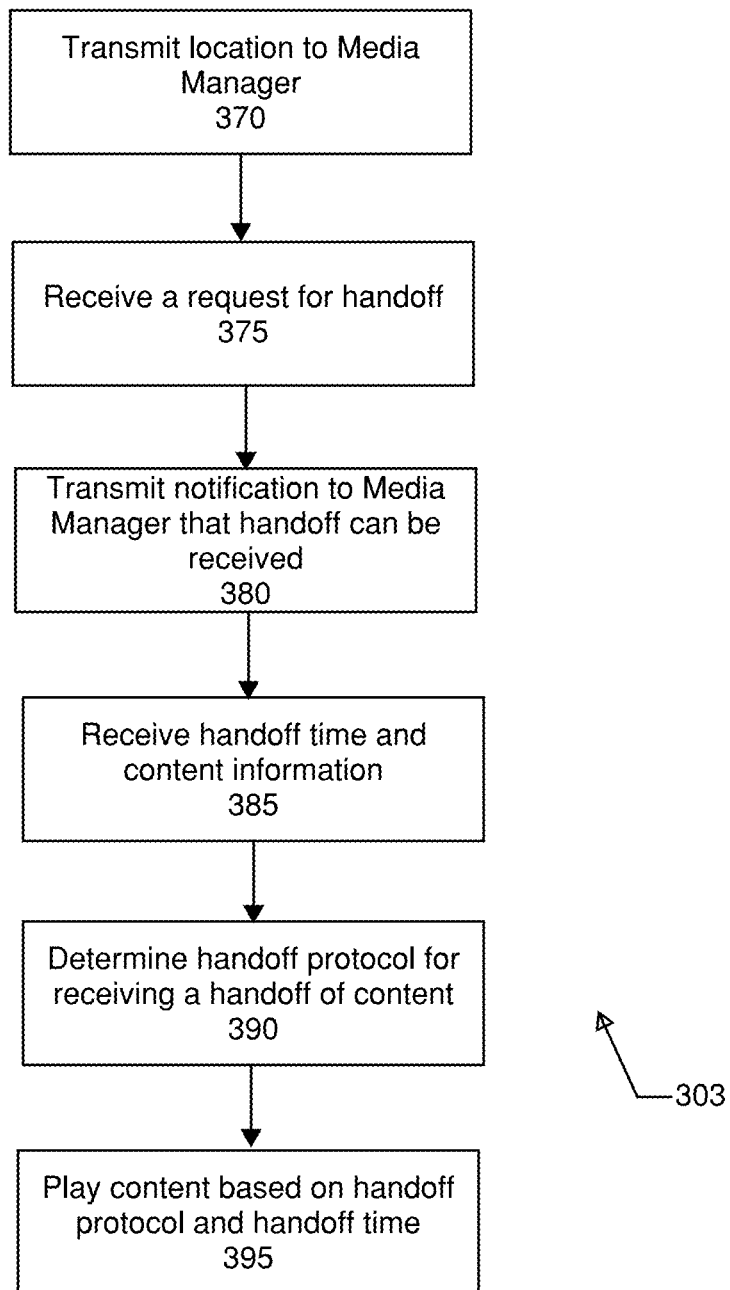
FIG. 3C illustrates an implementation of an example process for receiving a handoff of content play from another user device.

A user device may interact with the Media Manager and perform various operations when receiving a handoff from another user device to ensure that the handoff is possible and/or successful. FIG. 3C illustrates an implementation of an example process 303 for receiving a handoff of content play. The Media Manager may monitor user devices and the associations of user devices with a specific user to facilitate and control handoff operations. A user device may transmit a location to a Media Manager (operation 370). For example, a user device may indicate a location based on device position systems (e.g., GPS, triangulation, etc.). The user device may transmit this information along with other information such as device identifying information, state (e.g., active, passive), associated user, connected devices, etc. This information or portions thereof may be transmitted periodically and/or upon changes (e.g., changes in location, status, etc.). The Media Manager may utilize the received location information and/or other information (e.g., status, associated user) to determine whether to offer the user device as an option for handoff to other user devices.

The user device may receive a request for handoff (operation 375). The request may confirm timing information (e.g., confirm RTT and/or device time), status, etc. The user device may transmit a notification to the Media Manager that the handoff can not be received. For example, if the user device is below a threshold battery charge and/or the device is in power saving or power conservation mode, the user device may decline a handoff. As another example, if the user device is moving away from the device requesting handoff and/or detects weak network signal (e.g., weak Wi-Fi signal, weak cellular signal, weak Bluetooth signal), the user device may notify the Media Manager. As another nonlimiting example, if the content the handoff is associated with is not playable by the device (e.g., requires Flash Player by Adobe), the user device may transmit a notification to the Media Manager to restrict handoff.

As another nonlimiting example, the user device may transmit a notification to the Media Manager to restrict handoff if content such as music is handed off to second user device such as a desktop without speakers. In some implementations, the second user device such as this may be identified as an unsuitable user device for a handoff by the Media Manager and handoff to this unsuitable second user device may not be available (e.g., inhibited by the Media Manager). As another nonlimiting example, the user device may transmit a notification to the Media Manager to restrict handoff if content such as a game is to be handed off to a second user device, such as a console without a connected game pad (e.g., when a game is interactive and needs player control immediately). Since a controller would need to be connected after the handoff occurred and the game may continue without the controller attached in attempted handoff situations such as this, the Media Manager and/or the user device may inhibit this type of handoff. As another nonlimiting example, the user device may transmit a notification to the Media Manager to restrict handoff if a high definition video (e.g., 4K, 8K, 3D, etc.) is to be handed off to a laptop and/or smartphone with insufficient graphical processing power for content playback (e.g., in streaming services, such as Twitch, that may transmit content in original quality without compression) and/or with insufficient network capacity. As another nonlimiting example, the user device may transmit a notification to the Media Manager to restrict handoff if call is to be handed off to a device that does not have an appropriate input device, such as a dial pad. Moving a call to a standalone speaker, as opposed to a smart phone may mean that the user cannot enter dial tones and/or terminate the call (e.g., since physical play/pause/next/previous buttons may be the only available options on the device).

If a determination is made that the handoff can be received, a notification may be transmitted to the Media Manager in response to the received request for handoff (operation 380). For example, the user device may ping the Media Manager, may transmit timing and/or status information, and/or transmit any other appropriate notification. In some implementations, the Media Manager may make the determination that the handoff can be received if the Media Manager does not receive handoff rejection notification from the user device in response to a handoff request. For example, the Media Manager may proceed when a handoff rejection notification is not received within a given time frame (e.g., within 300 ms). unless an accurate estimate of time is required to process the handoff request (operation 375). An accurate estimate of the time for the handoff may be made based on RTT, device processing time, device load, etc., when known to the Media Manager.

The user device may receive handoff time and/or content information from the Media Manager (operation 385). The Media Manager may determine the appropriate handoff time based on the user device requesting handoff, the content being played, and/or the user device receiving the handoff and transmit this determined handoff time to the user device. The handoff time may provide a smooth transition of content play between the user devices, in some implementations (e.g., since the transition on both user devices may occur at approximately the same time or time period). The user device also may receive content information related to the content being played on the user device that has requested content. For example, content information may identify the content and/or type of content, the Content Provider, credentials and/or connection information for accessing content, user login information, DRM information, duration, time elapsed in content, types of controls allowed in content, etc.

The handoff protocol for receiving content in a handoff may be determined (operation 390). For example, just as content play may be terminated on a first device that hands off content play, content play on the second device receiving the handoff may be controlled by handoff protocol. The handoff protocol or portions thereof may be received from the Media Manager and/or retrieved from a memory accessible by the user device. In some implementations, the handoff protocol or portions thereof may be generated and/or derived on the user device.

Content may be played based on the handoff protocol and the handoff time on the user device (operation 395). For example, portions of the content may be allowed to activate prior to others (e.g., image may be displayed first), volume may be gradually or abruptly increased, and/or control (e.g., of interactive media) may be transferred. The user device may transmit a message that the status of the device is now active and/or the Media Manager may automatically change the status of the device.

The described processes 301, 302, 303 may be implemented by various systems, such as but not limited to system 200. In addition, various operations may be added, deleted, and/or modified. In some implementations, a described process may be performed in combination with other processes or portions thereof. For example, the first and second user devices may or may not be the same type of device. As nonlimiting examples, mobile phone may be able to handoff to a television and vice versa, a laptop may be able to handoff to a mobile phone and vice versa; and/or a tablet may be able to handoff to a smart watch.

In various implementations, the content may include media such as videos and/or audio tracks. The content may be live streamed, pre-recorded and streamed, downloaded, etc. The Media Manager may monitor the progress of the content play on a user device, the user device may transmit the progress of the content play to the Media Manager (e.g., directly, via Content Provider) and/or the Media Manager may receive and/or request content play information from the Content Provider (e.g., via an API provided by the Content Provider).

In some implementations, the content being played may include a call (e.g., audio and/or video). Since calls involve other users generally, unlike with downloaded or streaming videos, it cannot be paused or joined by any device. In some implementations, a call may be between a first user on a first device and one or more other users on other user devices. To handoff the call, the Media Manager may add the second user device to the call as another participant (e.g., using a proxy identifying number or second device identifying number) and then instruct the first user device to hang up the call (e.g., to allow the first user to transfer control of the call to the second user device) and/or hang up the call through Content Provider (e.g., VoIP call terminated by the server). For example, a cell phone operator may allow the call to continue even via the second user device and the other user devices of other users even though the first device has dropped off the call. As another example, a conference call may be temporary created to accommodate multiple devices connected at the same time (e.g., to effectively allow a second user device to join a call). Audio, video, and/or data stream from other call participants may be sent (e.g., routed) to both user devices at once, in some implementations.

In some implementations, the handoff is managed by the Media Manager. The first user device and/or a second user may initiate the handoff process (e.g., request a handoff from the first device). A handoff may be requested by a first user device and initiated by the second user device in some implementations (e.g., the second user device confirms that a handoff can occur and allows the Media Manager to determine an appropriate handoff time and/or protocol). Additionally, if the second user device fails to confirm or reject the handoff within a set timeframe, the Media Manager may decide to send the handoff timing and/or protocol to the second user device. A handoff may be requested by a second user device, in some implementations, and the Media Manager may manage the handoff such that the first user device ceases play of the content based on the request for handoff from the second user device. In some implementations, the first user device may control the ability of the second user device to accept the handoff and require the second user device to accept handoffs. The device(s) capabilities to decline and/or accept handoffs may be based on user preferences, default settings, and/or the Media Manager.

In various implementations, user devices in active states transmit information to the Media Manager (e.g., state, content information) continuously, periodically, and/or upon changes (e.g., in content and/or state). For example, if a user is added to a call, the Media Manager may be notified by information sent by one or more of the user devices using the Media Manager to manage the call. As another example, if a user pauses video and/or audio content, seeks in the content, skips back and/or forward in the content, changes content volume, the Media Manager may be notified. The user device in an active state may transmit information such as identifying information (e.g., user and/or device), and content information when transmitting location, state, and/or other information to the Media Manager.

In various implementations, the content played by user devices may be any appropriate type of content. The content may be live and/or pre-recorded. For example, content may include streaming media (e.g., live and/or pre-recorded) such as movies, TV shows, videos, game playing related media, games, etc. Content may include calls such as video, audio and/or phone calls. The Content Provider for calls may include providers capable of providing cellular and/or mobile data calls, calls as voice and/or video over internet, and/or any other appropriate type of call provider.

In various implementations, the Media Manager may manage and/or control the handoff of content by determining media information to be transmitted to a user device receiving a handoff request. The Media Manager may determine media information such as item of media, type of media, Content Provider, media state (e.g., paused, playing, 2× play, latency information, etc.), position in media (e.g., time elapsed since play, time marker in media track, etc.), time at which the state was captured (e.g., such that the Media Manager can automatically adjust media information as appropriate, such as system timestamp). For example, for a second user device to take a handoff of a live streaming video, the content location (e.g., Content Provider) may need to be identified. As another example, if a second user device is to take a handoff of a previously recorded video, the time lapsed in the video may be transmitted to the second user device along with an identification of a Content Provider. The Media Manager may use this information to facilitate the handoff of the media in a seamless way (e.g., such that a user's experience is not substantially diminished). As an example, in on-demand audio/video content, a spot on stream is marked and transmitted to the Media Manager and/or user devices. As another example, in live stream content, a moment in time is selected in the future, and at this time in the future, the first user device may cease play of the stream. The second user device may play this streaming content prior to the selected moment in time. As another nonlimiting example, in calls, a time in future may be determined and at least at this determined time the second device may be connected and/or the first user device may be disconnected. As another example, in games, there may be multiple moments identified and predetermined events may occur at these identified times (e.g., handoff of sound, video, and/or control). A seamless transfer, in some implementations, may include interrupted playback (e.g., where both devices are not playing at least a portion of the content). For example, a first device may play video with no sound, during handoff the first device may stop displaying the video on the screen while second device may start displaying the video on the screen with a delay (e.g., delay of 16 ms before frame is displayed on the LCD screen), and the user would perceive the transfer as seamless (e.g., the user may not perceive first device screen showing no video for 16 ms as their attention is on the second device where the image appeared). In some implementations, a seamless transfer may include uninterrupted playback (e.g., where both devices are playing at least a portion of content at the same moment). For example, a first device may play images but not sound (e.g., laptop with external speakers connected by auxiliary cable with external power switch in "off" position) while a second device, after handoff, may play images and sound (e.g., smartphone with built-in speakers and non-zero volume setting). A seamless transfer may not require user interaction beyond the handoff gesture (e.g., one-click/one-tap action to initiate the handoff, etc.). A transfer that is seamless may not have strongly de-synchronized (e.g., when the de-synchronization is noticeable by user and may impact receiving enjoyment from content) media playing on both devices at once (e.g., music A on first device at 0:40, music A on second device at 0:00 after handoff; video B on first device and Video C on second device after handoff; etc.).

The type of content may influence the type of media information captured. In some implementations, when the media is a call, media information may include unique identifiers of other participants, rendezvous points where participant information (which may include connection and identity information) can be retrieved, device components being utilized in the call (e.g., front/back camera, stereo/mono microphone, headphones/speaker, portrait/landscape mode, etc.). In some implementations, when the media is an interactive media, such as a game, media information may include type of game, state of the game, Content Provider (e.g., game server address), game level, game character information, device components being utilized for control (e.g., touchscreen, mouse, keyboard, gamepad, joystick), etc. This information may facilitate transfer with minimal additional input from the user. In some implementations, a user may gesture to handoff the content and then pick up the content viewing/gaming/etc. without additional input (e.g., the Media Manager may provide the instructions to each device to seamlessly transfer the content).

In various implementations, the handoff protocol may vary based on the devices involved, the content type, the Content Provider, latency, RTT, and/or any other appropriate information. The control of the media and portions thereof on each of the devices may be based on the handoff protocol. For example, call handoff protocol may stop sound on one device and begin sound on the other device in immediate succession. In some implementations, an image component of a call may overlap in play (e.g., each device may display the image). As another nonlimiting example, for media that includes audio tracks, the handoff may have a crossfade effect. For example, the volume may decrease gradually on a first device requesting handoff while the volume of the media item increases on the second device receiving the handoff. The length of time the volume is decreased over may be a predetermined amount and/or customizable. In some implementations, the rate at which the first device decreases volume may or may not be the same rate at which the second device increases volume. In some implementations, the rate of volume change may or may not be uniform. For example, the initial rate on the first and/or second device may be greater than the later rate of changes. In some implementations, when a media component has multiple components such as image, audio, and/or control features (e.g., for interactive media), each component may or may not be controlled individually in the handoff protocol. For example, control may be an abrupt change while volume may be gradual. As another example, image may be present on both devices (e.g., handing off and receiving devices) while control is possessed by one device. In some implementations, the Content Provider may impact the handoff protocol. For example, the Content Provider may limit the ability to pause games, live streaming events, control specific components of the content individually, etc. Thus, the handoff procedure may not include a crossfade, for example.

In some implementations, the handoff timing and/or protocol may be based on determination of media position, network latency, network bandwidth, device type, volume, refresh rate, system load, and/or any other appropriate information that may impact the seamless automatic transition and/or user's enjoyment of the content being played. For example, media position and/or playback time may be used for prerecorded media items. The media position may be utilized with the handoff time to ensure that the media played on the device receiving the handoff commences play at the proper media position. As another nonlimiting example, the Media Manager may utilize network latency and/or bandwidth information, since both impact delays in content play. Buffering and/or caching content on receiving device prior to handoff may be utilized to reduce the impact of network delays and/or bandwidth constraints. As another nonlimiting example, the device type may impact the Media Manager's control of the handoff. For example, some devices (e.g., Bluetooth speakers) have playback delays, so the first user device may play audio content longer when handing off to second user devices, resulting in audio playing through devices with playback delays (when compared to second user device that has no playback delays). Thus, auditory delays may be minimized by the Media Manager (e.g., using appropriate handoff time and/or protocol). As another example, content play information on the first user device (e.g., the device that hands off content) such as play volume may be utilized by the Media Manager to determine the appropriate rate of volume increase and the time period during which the volume is increased. Larger increases in volume may be performed over longer period of times to reduce the jarring and negative impact of sudden large volume increases on user enjoyment. As another nonlimiting example, device types may impact play and the Media Manager may base handoff protocol on the device type. In some implementations refresh rates and FPS may impact the smoothness of a transition between devices. For example, a phone's display may run at 60 Hz and a gaming monitor may run at 120 Hz, and this difference may be utilized by the Media Manager to in the handoff protocol. For example, the FPS may be lowered on a faster handoff source, before a slower handoff target begins presenting the content. As another example, with a fade-out style image transition used in the handoff, the refresh rate and FPS may be monitored and/or altered to achieve a predetermined duration and/or aesthetics for the transition. For example, if a fast transition is selected and a device can only support a low refresh rate or low FPS, the user of the system may notice transition steps without the intervention and adjustment made by the Media Manager (e.g., altering FPS and/or length of transition). In some implementations, system load may be monitored and delays due to system load may be accounted for in the handoff time and/or protocol. For example, during high system loads (e.g., exceeding a predetermined percentage such as 80%), content with lower bit rate may be selected (e.g., on-demand videos and/or with other content when available), transition style may be modified (e.g., using transition with less animations and/or effects), etc. to reduce the impact on the user's enjoyment of the content playback as it is handed off between devices.

In some implementations, the Media Manager may determine the length of time during which the rate of volume changes on the handoff source based on network latency and/or media position as appropriate. The Media Manager may additionally use device type, and/or system load. In some implementations, the Media Manager may determine the length of time during which the rate of volume changes on the handoff target based on network latency and/or media position as appropriate. The Media Manager may additionally use device type and/or system load. In some implementations, the Media Manager may determine the length of time that should proceed from the handoff time before stopping video on the handoff source based on network latency and media position as appropriate. The Media Manager may additionally use device type, system load, and/or refresh rate. In some implementations, the Media Manager may determine the length of time that should proceed from the handoff time before showing video on the handoff target based on network latency and media position as appropriate. The Media Manager may additionally use device type, system load, and/or refresh rate. In some implementations, in handoffs of games, the Media manager may determine the length of time that should proceed from the handoff time prior to stopping a game on the handoff source based on network latency and/or device type. The Media Manager may additionally use volume, system load, and FPS. In some implementations, in handoffs of games, the Media Manager may determine the length of time that should proceed from the handoff time prior to continuing a game on the handoff target based on network latency. The Media Manager may also use device type, volume, system load, and FPS.

In some implementations, the Media Manager may inhibit handoffs to devices in the active stage. In some implementations, the Media Manager may allow handoffs to devices in the active stage based on the required usage of the media item in the handoff. The Media Manager may identify conflicting content play and nonconflicting content play based on machine learning (e.g., trained to identify conflicting content) and/or based on predetermined criteria. A handoff to a second user device of conflicting content may cause the content already playing on the second user device to be stopped (e.g., based on handoff protocol, such as "abruptly" and/or "replaced by handoff media"). For example, if a game is playing on a second user device and music is handed off to this same device, since music can play along with the game, the content would not be conflicting. If the sound was critical to the game (e.g., based on a type of game), the music may be classified as conflicting by the Media Manager. As another example, if first music is playing on a second user device and a different second music item is handed off from the first user device to the second user device, then the first music item that was playing would be stopped before the handoff music (e.g., second music item) is launched. In some implementations, the termination of play of the first music on the second user device may be according to the handoff protocol.

In some implementations, the Media Manager may identify user devices capable of receiving a handoff based on user information, proximity to a first user device (e.g., that would handoff content play), and/or based on media information. In some implementations, the Media Manager may identify some devices and media items as unsuitable for a handoff, such as, but not limited to, on-demand video to a device without speakers, games to a smart watch, a call to a TV without a microphone, etc. The media information that may be used to identify user devices capable of accepting a handoff may include information related to the codec (e.g., some devices may not have the required codec to play music/videos), bitrate (e.g., network channel and/or storage that a device needs to have capacity to load and/or download the content), channels (e.g., for a video channel a device without a screen would be unsuitable; for an audio channel, a device without speakers would be unsuitable; an audio channel may be compatible with surround sound and stereo speakers; etc.), color depth (e.g., HDR content may be more suitable for a device that can play it and the Media Manager may have a predetermined preference to select a device that can play HDR while allow other devices to play the content assuming codec is present), and/or combinations thereof.

In some implementations, a handoff may be requested and/or initiated (e.g., handoff protocol commenced), but not completed. The Media Manager may monitor handoff completion and/or status and terminate a handoff (e.g., if the handoff protocol exceeds a predetermined period of time, if a user device fails to respond, etc.). In some implementations, the Media Manager may transmit a notification to a user based on the handoff status and allow the user to interrupt the handoff, change device involved in the handoff, pause a handoff, etc. For example, a network on which the second user device is connected may experience a slowdown, and the Media Manager may intervene as described. As another example, the second user device may experience a failure (e.g., shut off), and the Media Manager may intervene as described. In some implementations, the device and/or the Media Manager App may interrupt the handoff protocol based on user action and/or detected anomaly, such as, but not limited to, network disconnection, process and/or system error, driver error, and/or error in content playback API. For example, a user action may include pausing the content on second user device by pressing a button (e.g., physical button, pause button on graphical user interface, etc.), closing the content container (e.g., browser tab, browser window, dialog window, popup overlay, Picture-in-Picture window, etc.), closing and/or stopping the device (e.g., locking the screen, shutting down computer, turning off the TV, etc.).

In various implementations, the Media Manager may be in communication with one or more of the user devices continuously, periodically, when initiated by the user device, when initiated by the Media Manager, upon a change in condition (e.g., status, state, etc.), and/or combinations thereof.

Figure 4A:
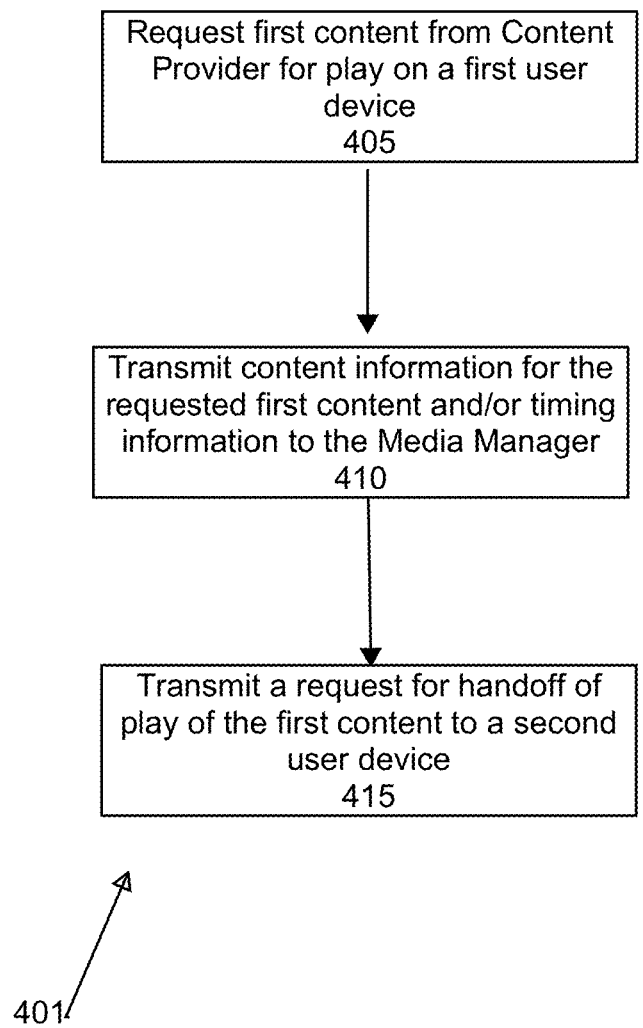
FIG. 4A illustrates an implementation of an example process for handing off content play from a user device.

In various implementations, the handoff between user devices, via the Media Manager, may be seamless. Users may be unaware of various operations of the Media Manager (e.g., provided via interfaces between the Media Manager and the user devices and/or Content Providers) and instead be presented with a streamlined experience (e.g., increasing user satisfaction, decreasing user input required, etc.). In some implementations, the Media Manager may manage and automatically provide instructions for handoffs and so the request for the handoff may be the only user provided information (e.g., the user may not have to open windows, select content, etc. on the second device). The Media Manager may respond to prompts by the first user device. FIG. 4A illustrates an implementation of an example process 401 for handing off content play between devices. A first user may request, via the first user device, first content to be played on the first user device from a Content Provider (operation 405). For example, the first user may start a game available from a Content Provider on the first user device. As another nonlimiting example, the first user may request play of a podcast from the Content Provider on the first user device. Content may be played via a GUI of the Content Provider, Media Manager and/or via another application on the device, in some implementations. For example, with video content the Media Manager may generate a web platform where videos are embedded using Iframes, for example, that would allow presentation of the content within the app window (e.g., when the app's code requests it to). Some content may be provided via players provided by a Content Provider (e.g., YouTube, Twitch, Vimeo) and/or via API (e.g., SoundCloud) utilized by the Media Manager and/or Media Manager App to present content.

In some implementations, audio and/or video stream for the call may be served from the other participants directly (e.g., peer to peer), via a relay server (e.g., of the Media Manager and/or a Third Party to facilitate peer to relay to peer connection), or via centralized servers (e.g., first participant to first server, second participant to first server, third participant to first server, etc.). Calling on mobile networks, in some implementations, may utilize centralized servers, which make it possible to have phone conferences (e.g., where multiple audio streams from multiple participants are put together and one audio stream is sent to a mobile phone). Content may be played within the interface or context of the Media Manager or portions thereof (e.g., associated applications) and/or it may come from the Content Provider directly or via third party code responsible for downloading and/or playing back the content. In some implementations, Content Provider may not be made aware that the user device is transmitting the timing and/or media information to Media Manager.

The content information associated with the requested first content and/or timing information may be transmitted to the Media Manager (operation 410). The content information and/or timing information may be transmitted approximately with the request for first content from the Content Provider, before requesting play of the first content, after requesting play of the first content, after commencing play of the first content, and/or at any other appropriate time. As a nonlimiting example, a user may press play on a YouTube video and then content and/or timing information may be transmitted before and/or after the content begins to download and/or stream. The content information may include a description of the content, identity of the Content Provider, login and/or access information for the Content Provider, playback position, playback statistics (e.g., ping, bandwidth, etc.), and/or any other appropriate information.

A request for a handoff of the play of the first content to a second user device, may be transmitted, via the first user device (operation 415). For example, the first user, via the first user device, may select a button, reorient the first user device (e.g., shake, rotate, etc.), reposition the device (e.g., lift off table, move from a predetermined area such as a geofenced area), may put the first user device within proximity of a passive or active NFC transmitter, may place the first user device within proximity of a Bluetooth device and/or Wi-Fi network, may connect the first user device to Bluetooth device or Wi-Fi network, etc. In some implementations, the request may be transmitted by the first user device to the Media Manager (e.g., via an application on the device and/or via a website generated by the Media Manager). For example, an application on user device(s) may run code that monitors such events (e.g., motion and/or orientation, such as shake, rotate, lift, move) and may notify the Media Manager when events are detected. Media Manager may then determine whether this action should trigger a handoff, in some implementations. In some implementations, a user may customize and/or utilize default values for what gestures indicate handoff (e.g., enabling automatic handoff of music when the Media Manager detects that the device is in a particular location, such as home). In some implementations, the handoff request may be initiated by Media Manager, which is acting as a proxy for a first and/or second user device (e.g., that had sent the notification about an implicit action).

Figure 4B:
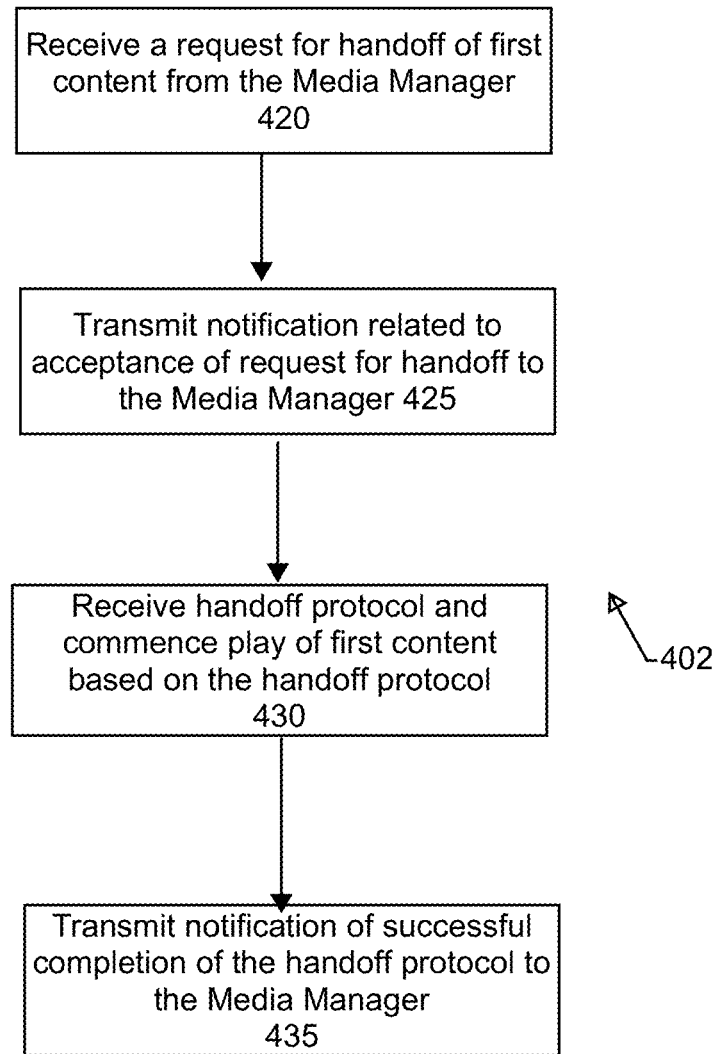
FIG. 4B illustrates an implementation of an example process for receiving a handoff of content play from another user device.

The Media Manager may manage received requests for handoffs and the experience the first user has on the second user device may be seamless and require minimal input as well. FIG. 4B illustrates an implementation of an example process 402 of receiving a handoff on a second user device (e.g., a receiving device). The second user device may receive a request for handoff of first content from the Media Manager (operation 420). This request may be based on the Media Manager receiving a request for a handoff from the first user device or from the Content Provider. The handoff may be initiated directly or indirectly from the first user device. For example, the first user device may send a handoff request directly to the Media Manager. As another example, the first user device may dial in to a Content Provider (e.g., as part of a VoIP call), and the Content Provider may send the handoff request to the media manager.

A notification related to acceptance of the handoff request may be transmitted to the Media Manager (operation 425) if a determination is made that the second user device is capable of receiving the handoff. The second user device may accept the handoff request as a default, in some implementations. The second user device may decline a handoff request from an unrecognized user (e.g., a user not associated with the device), when the device power is low, when the device is in a predetermined location, when user device is in an incompatible setting (e.g., do not disturb, silent, etc.) and/or any other appropriate rationale. In some implementations, the Media Manager may control the acceptance of handoffs and the second user device may be inhibited from declining the handoff request from the Media Manager.

The handoff protocol may be received from the Media Manager and play of the first content may be commenced on the second device based on the handoff protocol (operation 430). Along with the handoff protocol, content information about the first content (e.g., source, playback position, logon credentials, etc.) may be transmitted to the second device. In some implementations, the handoff protocol may be stored in the memory of the second device and retrieved based on instruction from the Media Manager. For example, an application on the device may include default handoff protocol that the Media Manager could instruct the device to retrieve. For example, a default handoff protocol may exist for pull type (e.g., handoff initiated on or on behalf of second user device) handoffs. For example, a second user device may send a request to Media Server and the Media Manager may reply with credentials to join the play of the content (e.g., a call). In some implementations, the Media Manager may not contact the first user device about the handoff, but rather the second user device may join the call and displays the appropriate user interface based on the default handoff procedure. The first user device may identify the handoff when the first user device detects a new call participant that shares the same user credentials (e.g., representing the same user), and then the first user device may triggers a default handoff logic to leave the call as soon as an audio stream is established for the second user device. In some implementations, no further Media Server communications may be transmitted and/or received in conjunction with the specified handoff.

A notification of successful completion may be transmitted by the second user device to the Media Manager (operation 435). The notification of the successful completion may include status information for the device (e.g., switch from passive to active) and/or updated content information (e.g., playback position, item playing currently on a playlist, etc.).

Figure 4C:
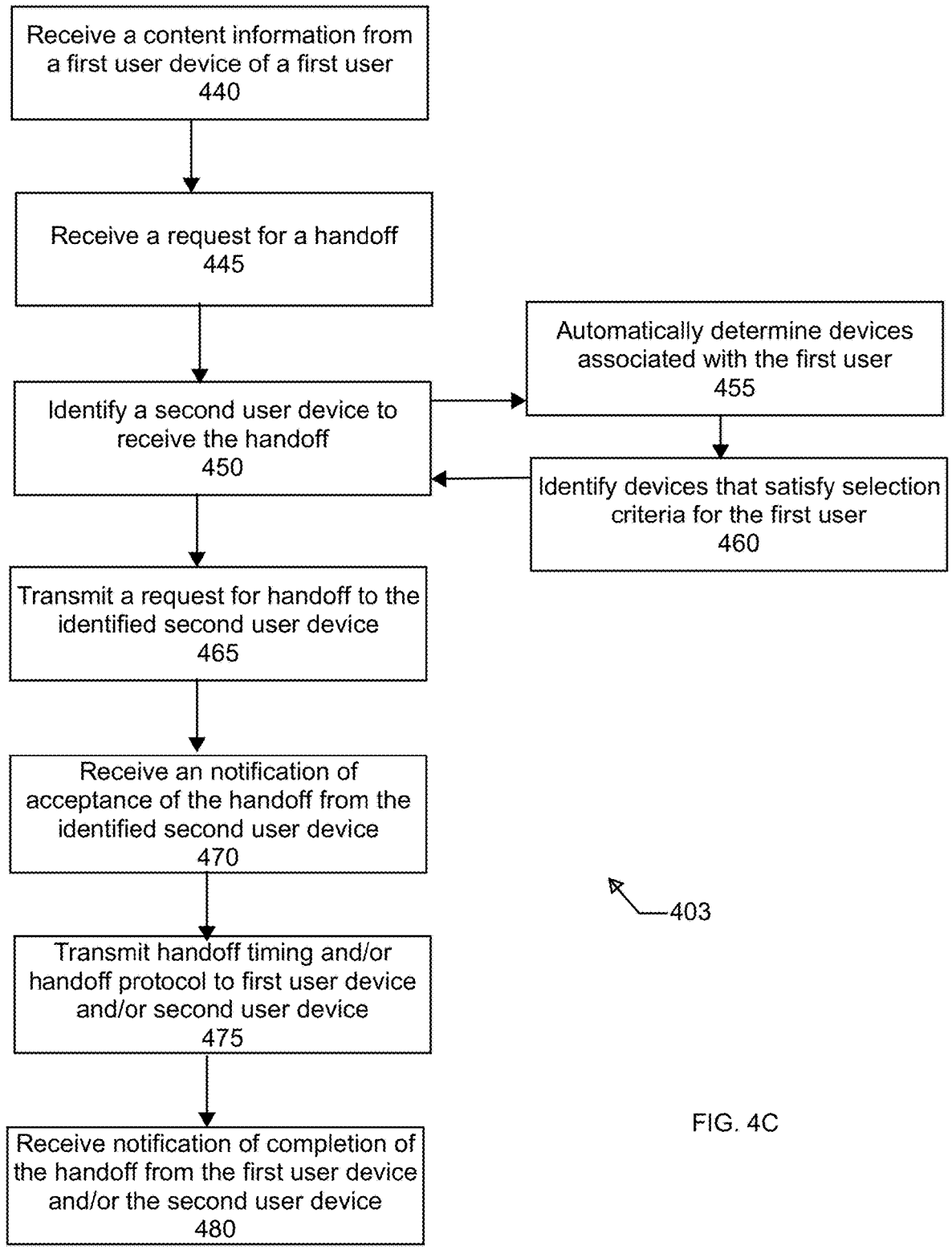
FIG. 4C illustrates an implementation of an example process for handing off content play between devices.

Thus, the handoff between devices may require minimal user input in some implementations. The Media Manager may manage the generation of instructions and analysis of determinations to successfully handoff content. FIG. 4C illustrates an implementation of an example process 403 for managing a handoff between devices associated with the same user. A first user may request play of first content (e.g., from a Content Provider) on a first user device. For example, a user may request a game to play, music to stream, a channel to watch, etc. Content information may be received from a first user device associated with a first user by the Media Manager (operation 440). For example, content information may include any appropriate information about the first content such as Content Provider from which the content is coming, content description, content length, playback position, playback statistics (e.g., ping, bandwidth, etc.), associated playlist, playlist position, playlist shuffle order, content identifier, content quality, playback rate, playback direction, subtitles track, content volume, content quality, and/or any other appropriate information. The content information may be transmitted periodically, upon change, etc.

A request for a handoff may be received (operation 445). For example, the Media Manager may receive a request for a handoff, such as the selection of a button and/or a gesture, from the first user device (e.g., push type handoff) or second user device (e.g., pull type handoff). The request may be a request for handoff and/or may include other information such as updated content information, status, device information (e.g., location, type, etc.), play information (e.g., playing from a maximized window, playing in an app, volume of play, etc.), etc. In some implementations, the content information may be transmitted with the request for handoff instead of prior to a request for handoff.

A second user device may be identified to receive the handoff (operation 450). For example, the Media Manager may receive an identification of a second device with the handoff request (e.g., a verbal command such as "handoff to my TV") and/or a preselected "preferred" second device may be identified by the first user (e.g., in stored first user information). In some implementations, the Media Manager may automatically determine which devices are associated with the first user (operation 455) and a device that satisfy selection criteria may be identified as the second user device to receive the handoff (operation 460). For example, a Media Manager may store a listing of devices associated with the first user (e.g., the first user may connect all devices to the Media Manager, the Media Manager may identify proximate devices, the first user may provide an identification and/or coupling between devices using one or more forms displayed on the user interface of the device. The Media Manager receives and stores the coupling information selected with the device. The device may include devices such as laptops, TVs, and phones and/or the device may include accessories such as speakers (e.g., connected via Wi-Fi Network and/or Bluetooth). The Media Manager may then utilize default and/or customized selection criteria to identify which device associated with the first user to select at the second user device to receive the handoff of content. For example, physical location, device type, device state (e.g., device may have other media playback running on it), etc. may be utilized as selection criteria. In some implementations, the Media Manager may select the last used device as the selected device for the handoff. In some implementations, the Media Manager may include and/or access machine learning systems trained on past behavior, selection criteria, default values, previous user corrections (e.g., user initiates a second handoff within a predetermined period of time), etc. The machine learning systems may include machine learning and/or other artificial intelligence algorithms such as nearest neighbor networks, decision trees, etc. Training data may include, in some implementations, available devices, their state (e.g., including but not limited to location), time of day, type of content, content information (e.g., title, genre, Content Provider), etc. The machine learning systems may utilize this information to learn user specific and/or default selections for the selection of the second device to receive the handoff when requested. In some implementations, when multiple devices satisfy the selection criteria and/or are available for receiving the handoff the Media Manager may use previous handoffs to determine which device to select for the handoff (e.g., via a decision tree created by the Media Manager). In some implementations, only one device may be selectable for the handoff (e.g., due to location, availability, compatibility with content type being played, etc.). In some implementations, the Media Manager may transmit a set of available devices based on the selection criteria to the first user device and the first user may select a second device from the set of available devices.

The machine learning system for determining suitable handoff targets may use the following Model inputs (X): a provider identifier (identifying the provider of the streaming content); a container type identifier (identifying the type of the container used to transmit the streaming content); a handoff source device type (identifying the type of the source device, examples of which include: "smartphone_ios", "smartphone_android", "laptop_windows", "laptop_macos", "laptop_linux", "smart_tv", etc.); and a handoff target device type (identifying the type of the target device, which may be the same as or different from the type of the source device).

The machine learning system may generate the Model output (Y), which may be a probability that the handoff is suitable (e.g., value of 1 indicates that the handoff is suitable and a value of 0 indicates that the handoff is not suitable).

A request for the handoff may be transmitted to the identified second user device (operation 465). The selected second user device may then be contacted by the Media Manager using any appropriate method (e.g., the method may be based on which method is suitable for device type and/or device state). For example, a smartphone first user device may lack a persistent connection to the Media Manager (e.g., since the user is not actively interacting with the second user device at the time handoff is started). Thus, system tools (e.g., high priority push notification in case of Android and iOS) launch the application code that may set up the connection to Media Manager and/or preliminary information may be transmitted about Content Provider and/or content to the second user device (e.g., Android and iOS push notifications may include additional data that is passed to the application code upon invocation). As another nonlimiting example, with a connected speaker as the first user device, a connection may be established (e.g., via Wi-Fi and/or via Bluetooth on a "host" device) to allow contact. In some implementations, devices that are not connected to the Media Manager and/or not connectable to the Media Manager (e.g., not pingable) may be excluded from the listing of available devices when the Media Manager determines which device to select as the second user device.

A notification may be received by the Media Manager of acceptance of the handoff from the identified second user device (operation 470). In some implementations, the second user device may confirm availability to receive the handoff. In some implementations, the Media Manager may decide to continue with the handoff without first receiving confirmation notification from second user device (e.g., after a timeout, device was setup to always accept the handoff and Media Manager is aware of that, etc.), as long as the Media Manager has not received a rejection notification from second user device. The second user device may transmit timing information (e.g., context, state, time, etc.) to the Media Manager (e.g. to facilitate handoff timing and/or protocol determination).

The handoff timing and/or handoff protocol may be transmitted to the first and/or second user devices (operation 475). The Media Manager may determine the handoff timing as previously described in some implementations. The handoff timing and/or handoff protocol may facilitate a seamless appearance to the first user in the transition between content play on the first user device and the second user device. For example, adherence to the handoff timing and/or procedure may reduce dead spots (e.g., points in the content play with no audio and/or no image presentation on either device) and increase user satisfaction with the handoff (e.g., volume on the second device may be similar to the volume played on the first, the content may be presented in a similar manner such as full screen, etc.).

The first user device may transition to ceasing first content play and the second user device may transition to playing first content (e.g., user devices may transition between active and passive states) by following the handoff protocol. The Media Manager may receive notification of completion of the handoff from the first user device and/or the second user device (operation 480). The notification may include a status change and/or other information. In some implementations, the first user device and/or the second user device may not be in persistent connection with the Media Manager after completion of the handoff. Devices may reestablish communication with the Media Manager upon changes, such as in state, location, and/or condition.

In various implementations, the Media Manager and user devices may operate in other manners to successfully handoff content between devices. For example, rather than actively handing off play of content from a first user device to a second user device, a second user device may takeover or request a handoff from a designated device (AD). The Media Manager may monitor and/or receive updates to status and content play from one or more user devices to facilitate this type of handoff. For example, a first user may have a plurality of user devices associated with the first user. User device(s) of the first user may request play of first content from a Content Provider and present this content via the user device(s). The user device(s) may transmit a notification to the Media Manager with timing information, state information (e.g., active), and/or content information (e.g., description, playback position, and/or playback statistics). The user device(s) may transmit changes to the Media Manager. For example, if playback and/or content state changes (e.g., pause, fast forward, skip, resume, end of stream, etc.) occur during the play of the first content, the first user device may transmit a message to the Media Manager with information related to the change (e.g., content state, playback statistics, etc.).

To handoff the content play, a second user device may request play of content playing on another device. The Media Manager may designate a device (AD) as capable of handing off content playing on this device when requested by another device. For example, a user device associated with the first user may begin play of the first content (e.g., by requesting play of the first content and/or after receiving the previous handoff), and may transmit timing information, state information, and/or content information, and this device may be designated or labeled AD. A second user device may take over this designation (AD) when it requests play of content and transmits information to the Media Manager (e.g., from the user device to the Media Manager, from the user device via the Content Provider to the Media Manager, directly from the Content Provider to the Media Manager, etc.) such as content information, status, etc. In some implementations, a second user device may initiate the take over (e.g., pull type handoff) after user action such as, but not limited to, pressing a button (e.g., physical button, GUI button, etc.), dialing a designated phone number, opening a URL in a web browser. Other user actions and actions on behalf of the user (e.g., Media Manager initiated handoff request) may include same types of actions used in handoff initiated on the first user device (e.g., push type handoff) described above. The Media Manager may allow institution of a handoff from this second user device now designated as AD based on these operations and/or receipt of this information. In some implementations, if the second user device (e.g., while playing the first content) seizes designation (AD), while first user device hasn't interrupted play, then the first user device may also update the Media Manager and restore its designation status (AD) with respect to the Media Manager and the play of the first content.

Thus, control and/or designation as an active (e.g., playing content) device may be transferred and/or passed between devices. For example, first user device may be a smartphone, a second user device may be a laptop and a third user device may be a Smart TV, all associated with a first user. Video may be played on the smartphone, which is designated (AD). Some time later, a different (or same) video is played on laptop, while the smartphone continues playback as normal, but the smartphone may lose its designation and the laptop may gain the AD designation. After some time, the laptop (e.g., with the AD designation) may seize video playback from the smartphone, the smartphone may identify this and in response notifies the Media Manager to reattribute the AD designation to the smartphone (e.g., by transmitting notification to the Media Manager) and the Media Manager may attributing the AD designation back to the smartphone. In some implementations, the smartphone may notify the Media Manager of the change when it determines that all other active devices that superseded it have seized playback or if the playback on smartphone is stopped and started. As a nonlimiting example, if the Media Manager receives content and/or state information from a smartphone, then after a delay, a laptop, then after a delay the Smart TV, which all begin playback of different videos, the designation (AD) may be first attributed to smartphone, then laptop, then Smart TV. Then, if the laptop seizes playback, smartphone may be inhibited from transmitting information to the Media Manager and/or recapturing active status, as there is still active playback on the Smart TV. Likewise, if the Smart TV seizes playback, the laptop may be the one to claim the AD designation. In some implementations, an exception may be if the smartphone seizes playback, while laptop and Smart TV continue it, then the smartphone starts new playback and becomes assigned AD designation.

Once the Media Manager receives the information from the user device(s) as described, the Media Manager may notify second devices with capacity to handle requesting a handoff from the AD designated device (e.g., devices with an ability to receive input from user). The Media Manager may indicate the availability for a request to take a handoff on a graphical user interface of the second devices (e.g., a physical button, touch screen with UI that has some input which triggers handoff, etc.). In order to notify second user devices, the Media Manager may determine a listing of user devices and sending information to the device(s) (e.g., as previously described based on the type of device, type of communication between the Media Manager and the device, presence of an existing persistent (two-way) connection). In some implementations, the Media Manager may use an API (e.g., first or third party) to invoke the device. After receiving the message, the second devices may not be required to establish a persistent connection with the Media Manager and/or provide a response, in some implementations. In some implementations, the Media Manager may not notify devices that do not satisfy selection criteria (e.g., devices that are inactive, in sleep, low-power mode, etc.). In some implementations, the Media Manager may be inhibited from waking asleep, inactive, and/or low-power mode devices (e.g., when other devices are available, due to default and/or custom settings, etc.). In some implementations, a subset of devices may be identified by the Media Manager and contacted as described (e.g., based on selection criteria, machine learning selections such as likely to be interacted with by the user, previously devices the user has interacted with, devices in the same location as the device with AD designation, etc.).

Thus, the AD designation may be pushed out to a plurality of devices to allow handoff to be taken by devices. AD status may be simultaneously held by more than one device, for example, if the devices play different content. For example, a smartphone that is in a call can be AD (call), a TV can be AD (video), etc. When the call on the smartphone is handed off from the smartphone to a laptop, the laptop would be designated as AD (call) while the TV maintains the AD designation (video) also. In some implementations, a device may have two AD statuses. For example, a device may be designated AD (music) and designated AD (game), when user is playing a game and has launched some music playback. These statuses can then be altered independently, for example by handing off the music to a speaker system. The device may still be designated AD for the game while losing the AD designation with respect to the music.

In some implementations, once the Media Manager receives the information from the user device(s) as described, the Media Manager may store this information for as long as the device maintains AD designation and/or for as long as the user is considered active (e.g., is actively playing media; has devices registered in the account; has used Media Manager App within the last 24 hours, etc.). Should the user use a second device to place a phone call to a designated phone number, then the Media Manager may use the stored information to select the appropriate AD designated device to perform the handoff to. In some implementations, if no devices are available, the phone call to a designated phone number may be rejected and/or ended by the Media Manager and/or by the Content Provider at the request of the Media Manager.

For example, a first user device may be playing content of a conference call that the user is part of, and thus making first user device an AD designated device. The user dials a designated phone number using second user device, and thus the second user device makes a handoff request to the Media Manager. The Media Manager selects the appropriate AD designated device, in this case first user device, based on stored information. The Media Manager instructs the first user device to perform handoff of audio content to the second user device.

In another nonlimiting example, the second user device may be playing content of a conference call after the user dialed a designated phone number. The user may also have first user device displaying video contents of the same conference call. The user hangs up the call on second user device, thus making a handoff request to Media Manager. The Media Manager looks up an appropriate AD designated device using the stored information. The Media Manager selects and notifies the first user device to receive the handoff for audio content from the second user device.

In some implementations, if a device was not sent the state update message (e.g., due to being offline, deemed inactive by the Media Manager, etc.), then the device may be responsible for gathering the latest AD designation on its own (e.g., upon startup and/or activation). For example, a smartphone that was not sent an update message may send a request to the Media Manager asking for current states when the smartphone regains network connection and/or leaves airplane mode. As another example, an application on laptop may request from the Media Manager state information (e.g., AD designation information) upon Operating System startup and/or upon being launched.

In some implementation, if a device makes the handoff request without knowing AD designation (e.g., device is not capable of receiving status update messages, communication protocol does not support custom fields, handoff request is made by making a phone call, etc.), then the Media Manager may use the stored AD designation information to determine the handoff source device, if any, and types of media content that would be transferred between devices.

A user may then be capable of initiating handoff on one of the second user devices. The second user device may have a content and/or system state, which may or may not be up-to-date with the Media Manager. The second user device may transmit a stored state information to the Media Manager. The Media Manager may receive this stored state information or a portion thereof and the Media Manager to handle this handoff initiation. The Media Manager may check if the state is up-to-date. For example, there may be at least two types of failures at this stage: either the state is for correct Content+Content Provider, but for wrong state (paused, skip, time, etc.), or it is for incorrect Content+Content Provider. For example, the second user device may lose some state updates and be unaware of it (e.g., it does not detect network problems on its end). The second user device may think that designated AD is playing video X at position Y, but in reality, designated AD may be playing video X at position Z or designated AD may not playing any video or playing video Q. When state is wrong, but Content+Content Provider is correct, the Media Manager may correct the state (e.g., following steps see the up-to-date state which is in sync with the Media Manager's internal state). The state may be linked to designated AD. In some implementations, the state may be wrong all together, the Media Manager may accept the wrong state and continue. This situation may cause an orphaned device, to be created in the system. An orphaned device may be a device who is linked to a state within Media Manager or on other devices, but this state doesn't reflect the device's actual state. In context of this step, if there is a designated AD that has some correct state A and there is second user device that has some incorrect state P, state P will be linked to the designated AD, but since P doesn't match with state of designated AD, the designated AD is designated as an orphaned device (e.g., a "stateless" device). The use of an orphaned device may improve user experience (e.g., user may see what they are expecting). For example, if the user has clicked on an icon that displays an album cover, the Media Manager may provide the user with Media playback that corresponds to that album, even if there is a designated AD present that is playing something different (e.g., a video and/or a game). Furthermore, a user may have initiated handoff from a second user device that doesn't support the content type of the content played by the current designated AD (e.g., handoff from a connected speaker in the wrong state, while designated AD is a smartphone running a game).

In various implementations, a state which was elected by the Media Manager as the "correct" one, is used to prepare a handoff protocol for device(s). An orphaned device may have a modified handoff protocol since the state doesn't match (e.g., there would typically not be a way to synchronize the content to each other). Therefore, the orphaned device would receive a handoff protocol that best mitigates the state mismatch. As a nonlimiting example, if "fade out" does not makes sense, then handoff will be handled in the fastest way possible. For example, a "fade out" may not make sense in some situations, and thus an empty handoff protocol (e.g., instant, without sound transitions, without video transitions) may be generated for the orphaned device. The Media Manager may determine the suitability of the handoff protocol (e.g., "fade out", etc.) based on predetermined criteria, machine learning, and/or default rules. For example, a second user device may request music play and the orphaned device has an active game session. Performing "fade out" on the orphaned device may be equivalent to pausing/existing the game, which is not necessarily what the user is expecting when we they request music playback on, say, connected speaker. Thus, the "fade out" would be deemed inappropriate. As another example, if a smartphone (e.g., designated AD) playing music from Content+Content Provider pair J, and a connected speaker (e.g., second user device) is requesting handoff for Content+Content Provider pair K, then it makes sense to "fade out" conflicting Media playback on smartphone before initiating different Media playback on connected speaker.

When the machine learning system is used to determine the suitability, the machine learning system may generate a probability that a handoff is suitable for each pairing of available devices. After generating the probabilities, the Media Manager may then select the pairing of devices with the highest probability for transitioning the streaming media.

The content may then be handed off to the second device from the first device as previously described (e.g., according to handoff timing and/or handoff protocol provided by the Media Manager). The user devices may transmit notifications to the Media Manager that the handoff was or was not successful and/or the Media Manager may update the state of the involved user devices. For example, once the handoff is completed, the designated AD may transmit a signal to the Media Manager to end the content play and Media Manager may update the playback state of the designated AD and remove the AD designation. The second device may gain the AD designation and may signal content to begin play and provide status update(s) on the content play to Media Manager. In some implementations, one or more of the user devices (e.g., the AD designated device) may close the persistent connection with Media Manager (e.g., if one was present).

EXAMPLES

Example 1

A first user is having a conversation on their mobile device and decides to switch over to their computer. The person performs a gesture on their mobile device (e.g., a request for handoff), indicating the intention to transfer the call. The availability of this gesture is determined by the Media Manager and indicated by the device (e.g., on a graphical user interface generated by the Media Manager Application), for example, when the Media Manager detects the presence of a valid handoff target. The Media Manager app on the phone lets the first user know that they are in close vicinity of a desktop that can receive the video calls, for example. Once the mobile device recognizes the gesture, the mobile device sends the request to the Media Manager (e.g., a server such as a web server) indicating that the mobile device wants to handoff the call to another device, in the proximity of its current location. The Media Manager may determine whether proximate user devices are capable sending video and/or producing audio output for the call. The Media Manager may determine the currently available devices of this first user (e.g., based on associations, locations, and/or status of devices) and identifies a desktop, capable of receiving a handoff of the call. The Media Manager transmits an incoming handoff notification to the desktop computer. At this point, the desktop computer may, or may not, have enough information to perform the handoff. If additional information is determined to be needed to perform the handoff, the desktop computer may request additional information from the Media Manager. In some implementations, the desktop computer may initiate the handoff procedure.

FIG. 5A and FIG. 5B show an embodiment of EXAMPLE 1 using a push mode handoff protocol. Turning to FIG. 5A, the mobile device 502 is running the application 504. The application 504 is a streaming video calling application that display an "end call" button to end the call.

Turning to FIG. 5B, the application 504 running on the mobile device 502 is updated to include the "Continue call on desktop" button 508. The button 508 may be displayed after the Media Manager determines that the mobile device 502 and the desktop computer are within a threshold distance (e.g., 10 meters) or are on the same computer network. The location may be determined by looking up the internet protocol (IP) addresses of the mobile device 502 and the desktop computer using an IP address location database. Selecting the button 508 transfers the call from the mobile device 502 to the desktop computer.

Example 2

A first user may play and/or watch a game on a first device and decide to switch over to a second device. The person may request a handoff (e.g., by selecting a button on a graphical user interface generated by the Content Provider) on the first device and the Media Manager may automatically handoff the content play to a second device. The Media Manager may identify possible second devices capable of receiving the handoff and may automatically select a second device to receive the handoff or request from the first user which second device to which to handoff content play. The devices may handoff the content play based on handoff protocol. The images and/or audio associated with the game may be presented on both devices for a period of time during which control of the game is allowed on one of the devices. In some implementations, the handoff may handle the game controls. As an example, the audio/video will be handed off to the second device, while the first device may continue to provide the game controls. The game may or may not be automatically paused during the handoff (e.g., less than 1 second).

FIG. 6A, FIG. 6B, FIG. 6C, and FIG. 6D show an embodiment of EXAMPLE 2 using a push mode handoff protocol. Turning to FIG. 6A, the mobile device 602 is running an application that is displaying the game interface 604. The game interface 604 includes the on-screen controls 606 shown as a pair of joysticks. The game interface may be for a game that is being streamed to the mobile device 602.

The game interface 604 running on the mobile device 602 include the user interface element 608, which may be an icon or button. The user interface element 608 may be displayed after the Media Manager determines that the mobile device 602 and the desktop computer 612 of FIG. 6C are within a threshold distance (e.g., 10 meters) or are on the same computer network. Selecting the user interface element 608 transfers the game interface 604 from the mobile device 602 (shown in FIG. 6A) to the desktop computer 612 (shown in FIG. 6D).

Turning to FIG. 6B, the desktop computer 612 is ready to receive the game interface 604.

Turning to FIG. 6C, the game interface 604 has been transferred from the mobile device 602 to the desktop computer 612. The application running on the mobile device 602 continues to display the controls 606, which may continue to be used to control the game interface 604.

Turning to FIG. 6D, the desktop computer 612 displays the game interface 604 after being transferred from the mobile device 602 to the desktop computer 612. Additionally, the desktop computer 612 may also include human input device to provide controls for the game, which may be used in addition to the controls 606 displayed on the mobile device 602.

Example 3

A first user may listen to music on a first device (e.g., smartphone with headphones plugged in). The person may enter their home (e.g., equipped with a sound system with a central hub and a set of connected speakers). Upon the Media Manager becoming aware (e.g., by a smartphone or other first device sending regular notifications to the Media Manager) of the first device entering the Wi-Fi range of multiple known Wi-Fi networks that are associated with user's home, and based on individual user settings, may initiate a handoff between first device and home sound system (e.g., central hub, also referred to as a second device) by creating handoff protocol and delivering it to first and second devices. For example, a handoff protocol may include a central hub initiating playback of same music track from the same positions as first device is playing; starting with 0 volume and gradually increasing the volume over some period of time; the smartphone continuing music playback at the current rate and volume for a short period of time; and before the central hub increases the volume above a pre-defined threshold the smartphone begins reducing the volume until it is 0; then music playback stops on smartphone. The person may experience a seamless handoff of music and can disengage the first device (e.g., can take out the headphones and leave the smartphone on a table, all while still hearing the music).

Example 4

A first user may be watching a live stream on a first device that is stationary in nature (e.g., desktop computer). The person may leave the room and/or leave the home. The person may unlock their smartphone (e.g., second user device) and request currently playing content to be handed off from first device to their smartphone by interacting with the smartphone (e.g., pressing a button on home screen, pressing a button in the Media Manager App, etc.). For example, the smartphone may launch the playback of a live stream and once the stream is playing send a handoff request notification to Media Manager. The Media Manager may notify the first user device (e.g., a desktop computer with a web client of the Media Manager running in a browser on the desktop computer) about the initiated handoff by sending it handoff timing and handoff protocol (e.g., blank handoff protocol, which indicates an instant pause of live stream). After handoff protocol is followed by both devices (e.g., first user device followed handoff protocol generated by Media Manager, second user device followed handoff protocol stored on the device) the person is ready to leave the room and/or home while having an uninterrupted watching experience of a live stream event. The handoff may have been completed with minimum interactions to set up the live stream on the second user device (e.g., pressing one button as opposed to finding and launching a correct streaming app, searching through stream collection for correct stream, launching the stream, then interacting with first device to stop the stream playback there).

Figure 7B:
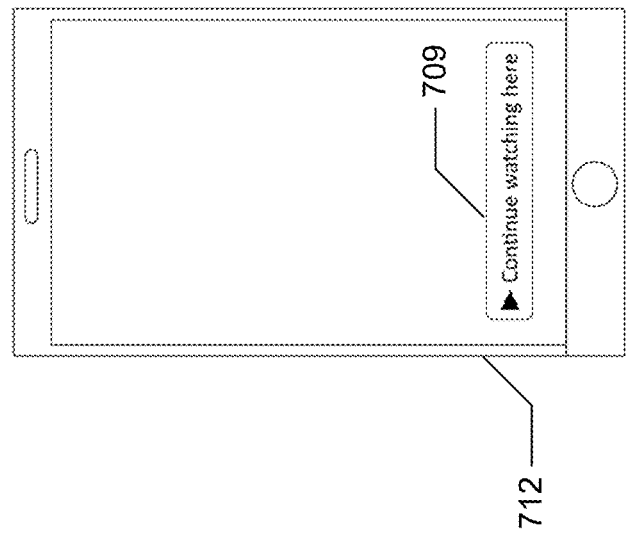
Figure 7A:
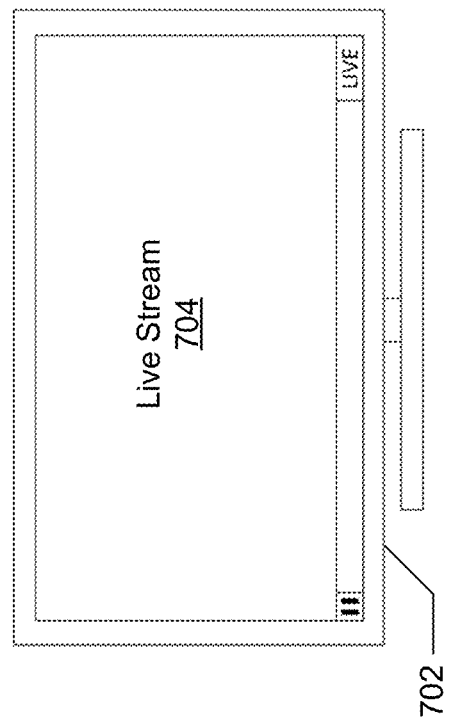
Figure 7D:
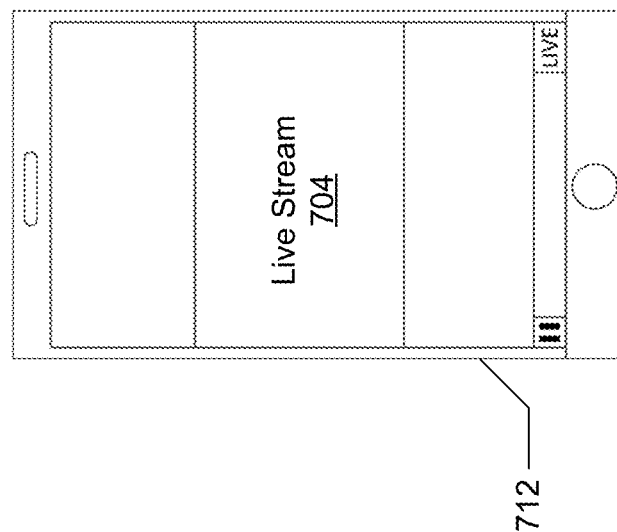
Figure 7C:
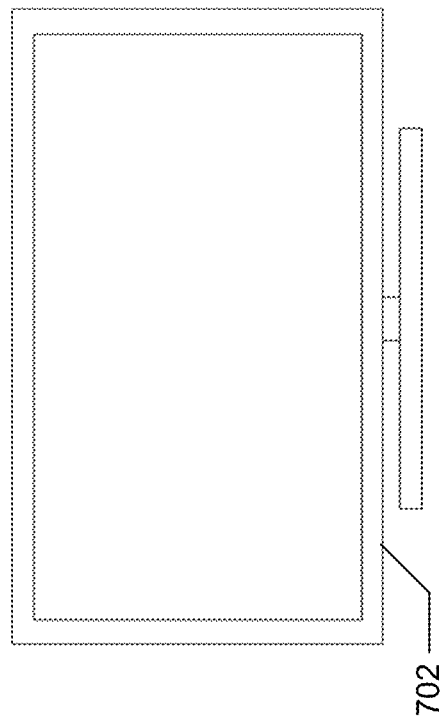

FIG. 7A, FIG. 7B, FIG. 7C, and FIG. 7C show an embodiment of EXAMPLE 4 using a pull mode handoff protocol. Turning to FIG. 7A, the desktop computer 702 is displaying the live stream 704 in an application running on the desktop computer 702.

Turning to FIG. 7B, the mobile device is running an application displaying a "Continue watching here" button 709. Selecting the button 709 will pull the live stream from the desktop computer 702 to the mobile device 712.

Turning to FIG. 7C, the desktop computer 702 has transferred the live stream 704 to the mobile device 712 and is no longer displaying the live stream 704.

Turning to FIG. 7D, the mobile device 712 displays the live stream 704 after the transfer in an application running on the mobile device 712.

Example 5

A first user may be participating in a video call on their laptop computer in the office. The laptop computer battery charge may be running low and the person may desire to continue the call on another device. The person may choose to continue the video call on a desktop computer (e.g., a second user device). The person may engage with desktop computer (e.g., move the mouse to wake from sleep mode, press the power button to power on or wake from hibernation, etc.) and then request handoff of the video call by interacting with desktop computer (e.g., clicking once on a Media Manager App icon in system tray, double-clicking on Media Manager App shortcut on desktop, opening a designated URL in the web browser, pressing a button in Media Manager App where the App may need to be launched first unless already open, etc.).

For example, the Media Manager App may receive the handoff instructions from the Media Manager and may display the video call on the monitor attached to a desktop computer (e.g., show audiovisual content and/or avatars from call participants, display the video call user interface with a button to hang up the call and/or mute audio or video, etc.). The Media Manager may determine that content play has been initiated, and thus handoff has been completed on second device, when the audio and/or video content from call participants begins being streamed through Media Manager by the second device. In some implementations, the Media Manager App may send a notification to the Media Manager about handoff completion. At the same time as sending the handoff instructions to the second device, the Media Manager may send handoff instructions to first user device (e.g., a laptop computer). In some implementations, the first user device will cease the content play (e.g., audio and/or video content from video call participants will stop playing and user interface elements of the video call may cease to be displayed on the laptop computer screen) seamlessly when the second user device initiates content play. The handoff may have been completed with no loss of audio and/or video content from call participants by the user, additionally call participants may experience a seamless transition between audio and/or video stream from the first user device and audio and/or video stream from the second user device.

Figure 8A:
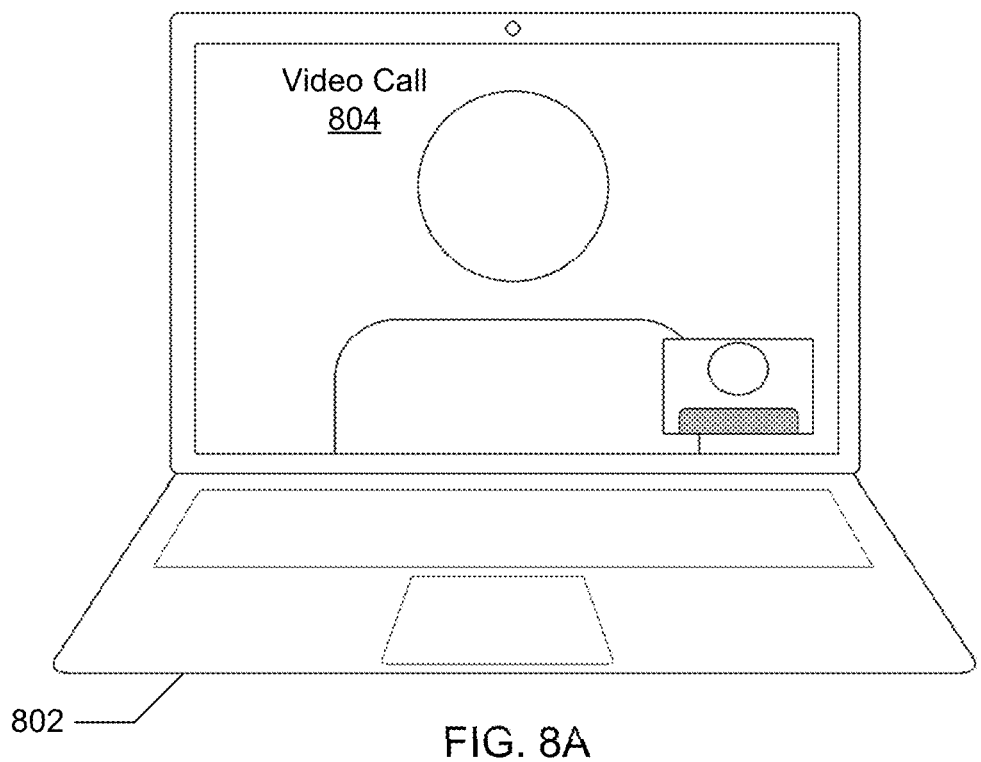

FIG. 8A, FIG. 8B, FIG. 8C, and FIG. 8D show an embodiment of EXAMPLE 5 using a pull mode handoff protocol. Turning to FIG. 8A, the laptop computer 802 is displaying the video call 804 in an application running on the laptop computer 802.

Figure 8B:
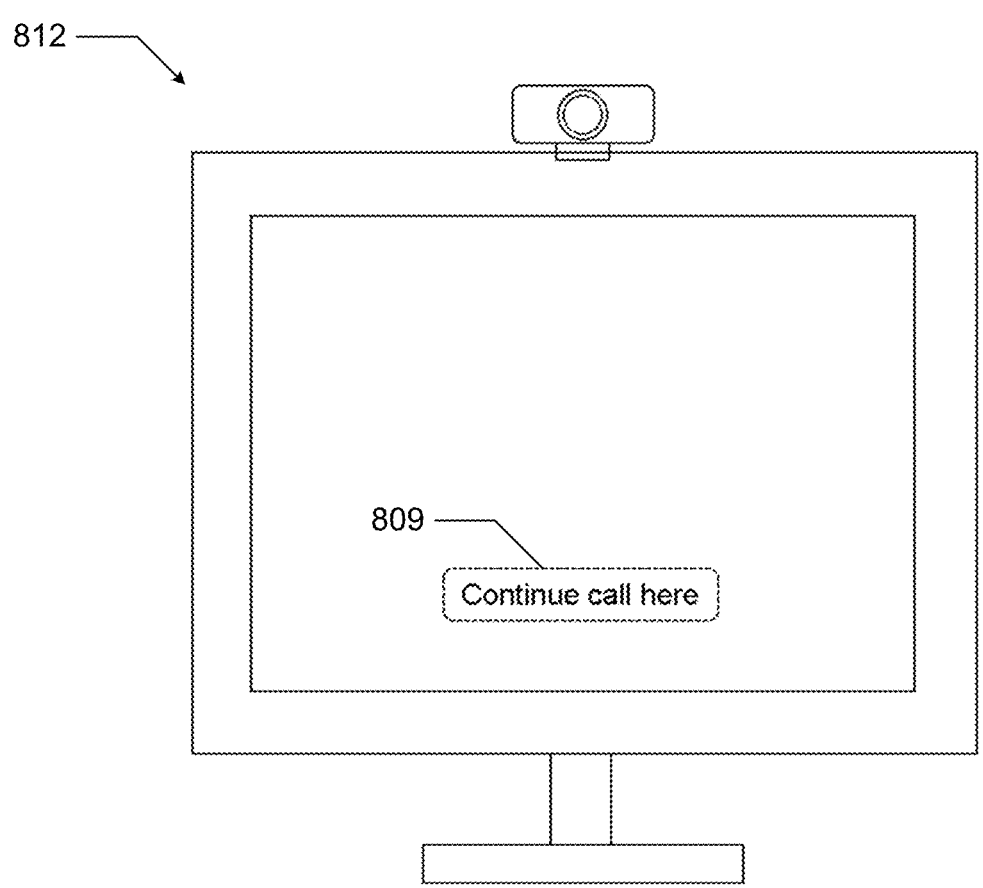

Turning to FIG. 8B, the desktop computer 812 is running an application displaying a "Continue call here" button 809. Selecting the button 809 will pull the video call from the laptop computer 802 (of FIG. 8A) to the desktop computer 812.

Figure 8C:
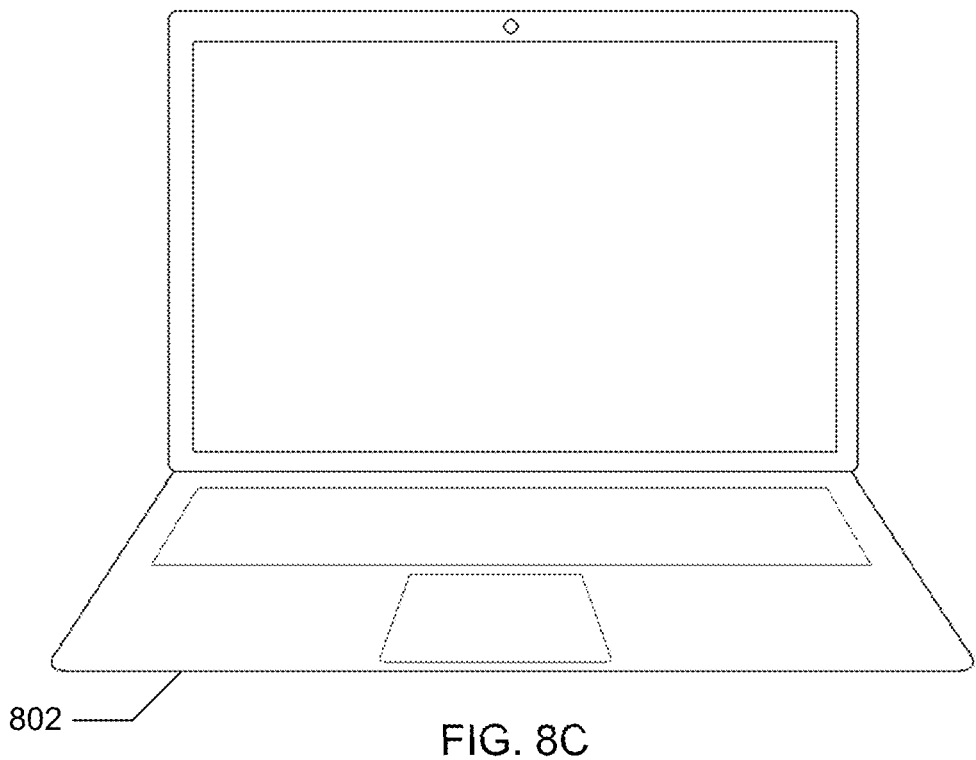
Figure 8D:
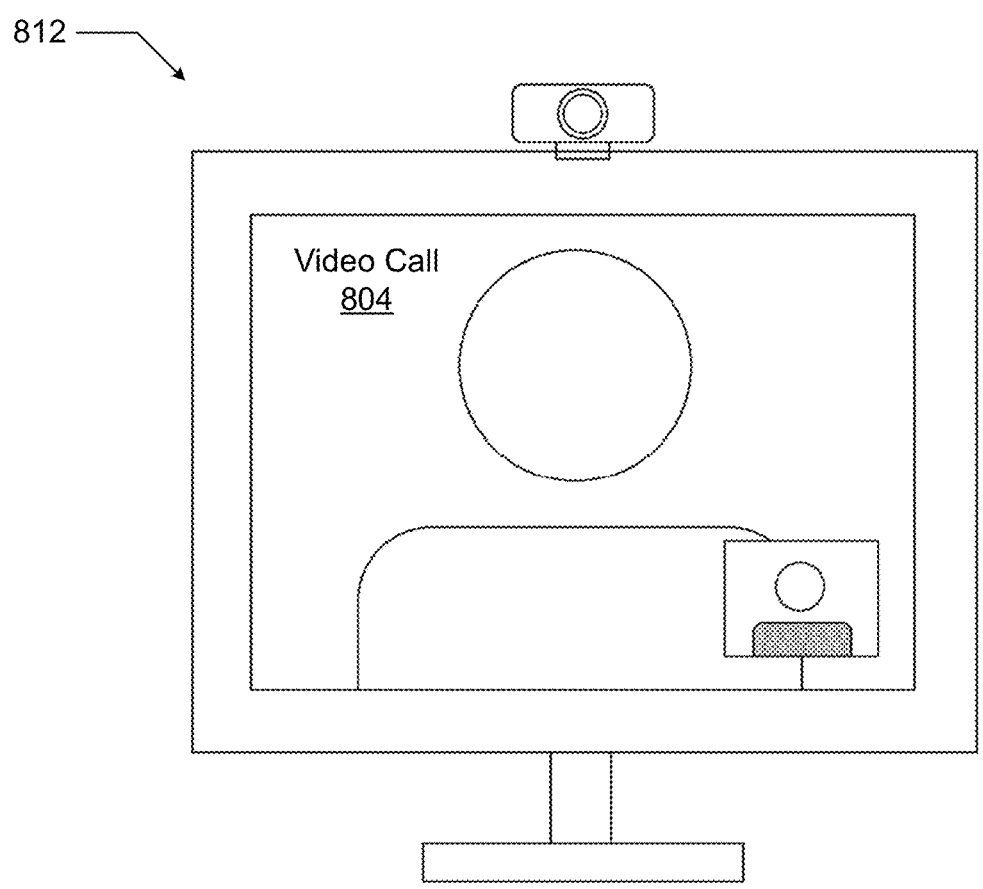

Turning to FIG. 8C, the laptop computer 802 has transferred the video call 804 (of FIG. 8A) to the desktop computer 812 (of FIG. 8D). The video call 804 is no longer displaying the video call 804.

Turning to FIG. 8D, the desktop computer 812 displays the video call 804 after the transfer. The video call 804 is displayed in an application running on the desktop computer 812.

Example 6

A first user may be participating in a group video conference call on a first device that is stationary in nature (e.g., with a desktop computer). The person may need to leave their place for a period of time (e.g., to pickup mail, to answer the door, to check on cooking progress, etc.). The person may pick up their smartphone and dial a designated phone number (e.g., using quick dial feature to call a phone number without unlocking the smartphone, using a hotkey configured to dial a preset number with three consecutive button presses, etc.).

The Media Manager may discover the phone call, via the Content Provider, and may respond by initiating a handoff for supported media type (e.g., audio content) from the first device (e.g., the desktop computer) that is playing audio and/or video content to the second user device (e.g., the smartphone, a cell phone, a wireless VoIP phone). The Media Manager may notify the first user device about the initiated handoff by sending the first user device handoff timing and handoff protocol information (e.g., a blank handoff protocol, which indicates an instant pause of audio content playback). The Media Manager may communicate with the Content Provider (e.g., by using Content Provider APIs) to initiate audio content playback from the group video conference on the second user device via the Content Provider. After the handoff protocol is followed, the first device is displaying video from and/or avatars of the group conference call participants. The second user device is playing audio content of the group conference call. The person may walk away from their place carrying the second user device and continue hearing the audio from each of the group conference call participants away from the first user device that is stationary. The person may walk back and/or walk past the place where first user device is located (e.g., stationary desktop computer) and to see video content and/or avatars of group video call participants on the first user device without having to request a new handoff.

Additionally, the person may end the phone call (e.g., tapping a button on the touch screen to hang up, pressing lock screen button to end the call, etc.), which may initiate a handoff request (e.g., the Content Provider may send a notification about call ending to the Media Manager) for audio content from second device back to first device. The Media Manager may notify first user device about the new handoff by sending handoff timing and handoff protocol (e.g., blank handoff protocol, which indicates an instant play of audio content from group video conference). After second handoff protocol is followed by first user device, the person may hear all audio content and video content coming from first user device (e.g., the stationary desktop computer).

Figure 9A:
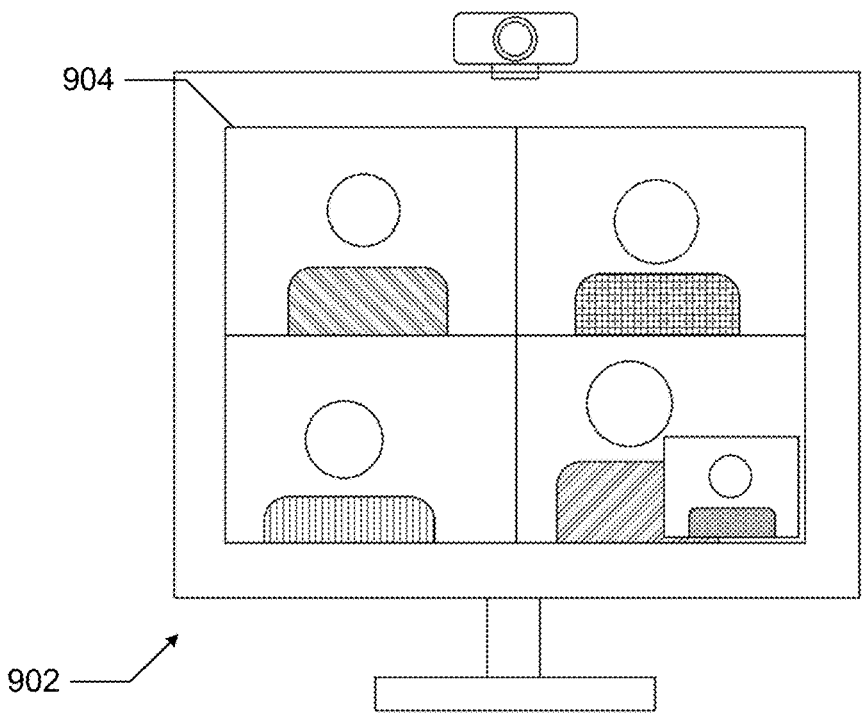

FIG. 9A, FIG. 9B, FIG. 9C, and FIG. 9D show an embodiment of EXAMPLE 6 using a pull mode handoff protocol. Turning to FIG. 9A, the desktop computer 902 is displaying the group video conference participant video content and/or avatars 904 in an application running on the desktop computer 902.

Figure 9B:
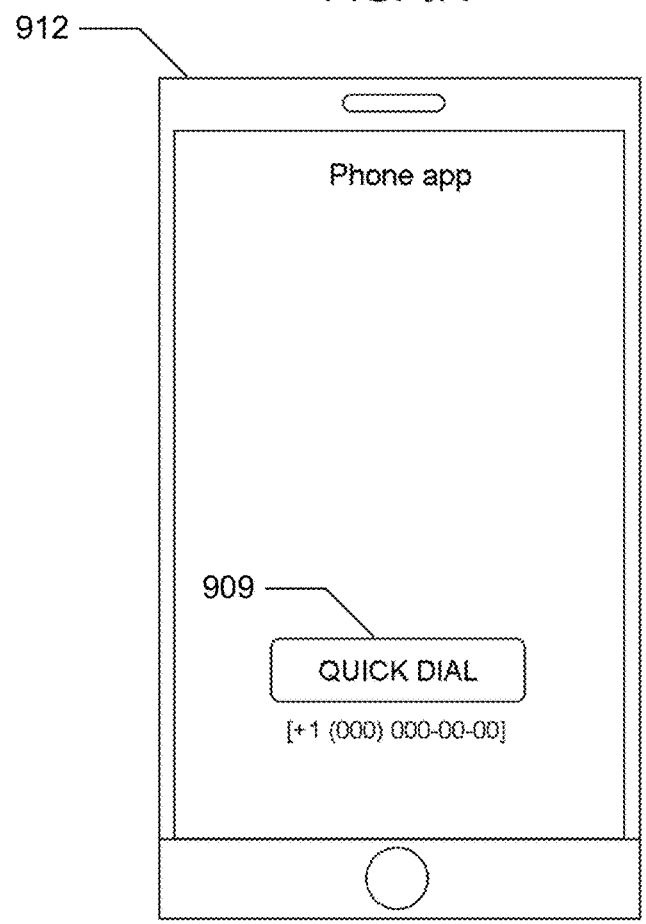

Turning to FIG. 9B, the mobile device 912 is running an application for dialing phone numbers displaying a "Quick dial" button 909. Selecting the button 909 will initiate a phone call using cell and/or Wi-Fi calling functionality to a previously stored designated number, which in turn will initiate a transfer of audio portion of the group video conference call from the desktop computer 902 to the mobile device 912.

Figure 9C:
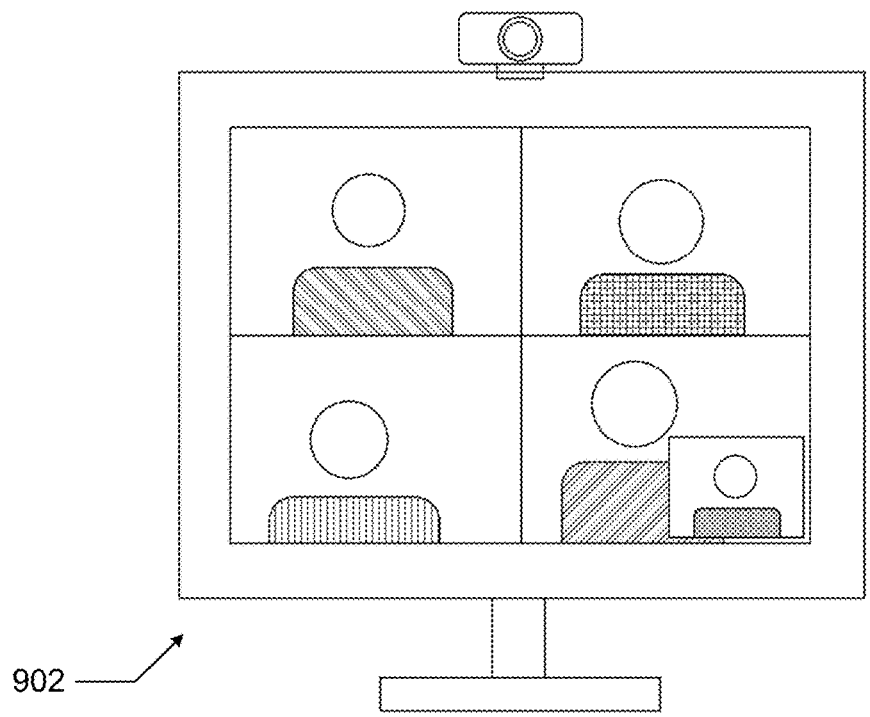

Turning to FIG. 9C, the desktop computer 902 has transferred the audio portion of the group video conference call to the mobile device 912 (of FIG. 9D) and is no longer playing audio content from the conference call.

Figure 9D:
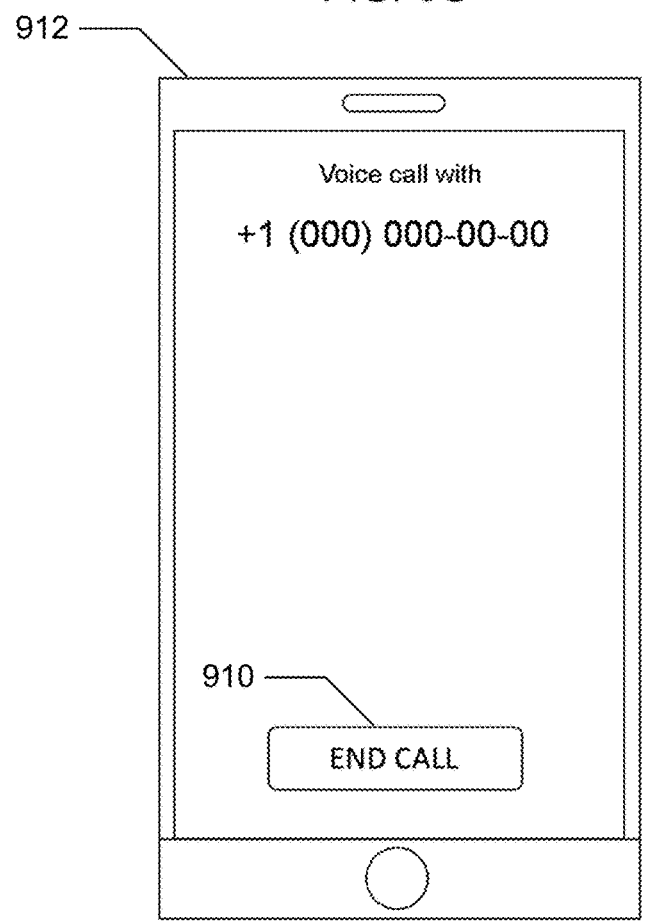

Turning to FIG. 9D, the mobile device 912 is running an application for dialing phone numbers, is displaying a call in progress screen with designated phone number, and is displaying an "End call" button 910. The mobile device 912 is playing audio content from the conference call after the transfer from the desktop computer 902. Selecting the button 910 will end the phone call, which in turn will initiate a transfer of the audio portion of the group video conference call from mobile device 912 to the desktop computer 902.

Example 7

A first user is having a voice conversation on their mobile device (e.g., a first user device) using cellular and/or Wi-Fi connection through a designated phone number line to connect to a group video conference and consuming only the audio content of the conference, and decides to switch over to their laptop (e.g., a second user device) in order to see other group video call participant videos and/or avatars and possibly share their own web camera feed with other participants. The person may first engage with their laptop computer (e.g., tap on the mouse and/or touchpad to wake the laptop from sleep mode, open the laptop lid if it was closed to wake the laptop from sleep mode, press the power button to power on or wake the laptop from hibernation, etc.) and then request a handoff of the call by interacting with an application on the laptop (e.g., clicking once on a Media Manager App icon in system tray, double-clicking on the Media Manager App shortcut on desktop, opening a designated URL in the web browser, pressing a button in the Media Manager App and/or website where the App and/or website may need to be launched first unless already open, etc.). The Media Manager prepares and transmits handoff timing and/or protocol to second user device (e.g., laptop) and prepares and executes handoff instructions that are to be applied to the first user device (e.g., a cell phone, a VoIP phone, a smartphone, etc.). For example, the Media Manager may contact a Content Provider that is responsible for processing incoming voice calls to designated phone number(s), the Media Manager may provide handoff protocol that was converted to a format that the Content Provider may understand, or the Media Manager may execute the handoff protocol for the first user device by making Content Provider API invocations to end the call at the right time (e.g., according to the handoff protocol). Once the handoff protocol is followed for both devices, the first user device should cease all content play and it may lock its own screen and go into sleep mode, and the second user device may be playing conference audio and displaying on its built-in monitor a user interface containing video and/or avatar content for group video conference.

Figure 10A:
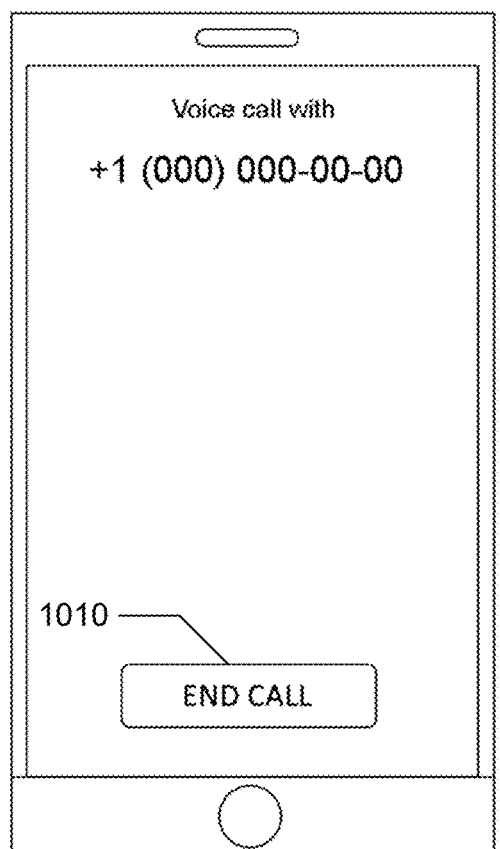

FIG. 10A, FIG. 10B, FIG. 10C, and FIG. 10D show an embodiment of EXAMPLE 7 using a pull mode handoff protocol. Turning to FIG. 10A, the mobile device 1002 is running an application for dialing phone numbers displaying a call in progress screen with designated phone number, and also displaying an "End call" button 1010. Selecting the button 1010 will end the voice call and no handoff would occur.

Figure 10B:
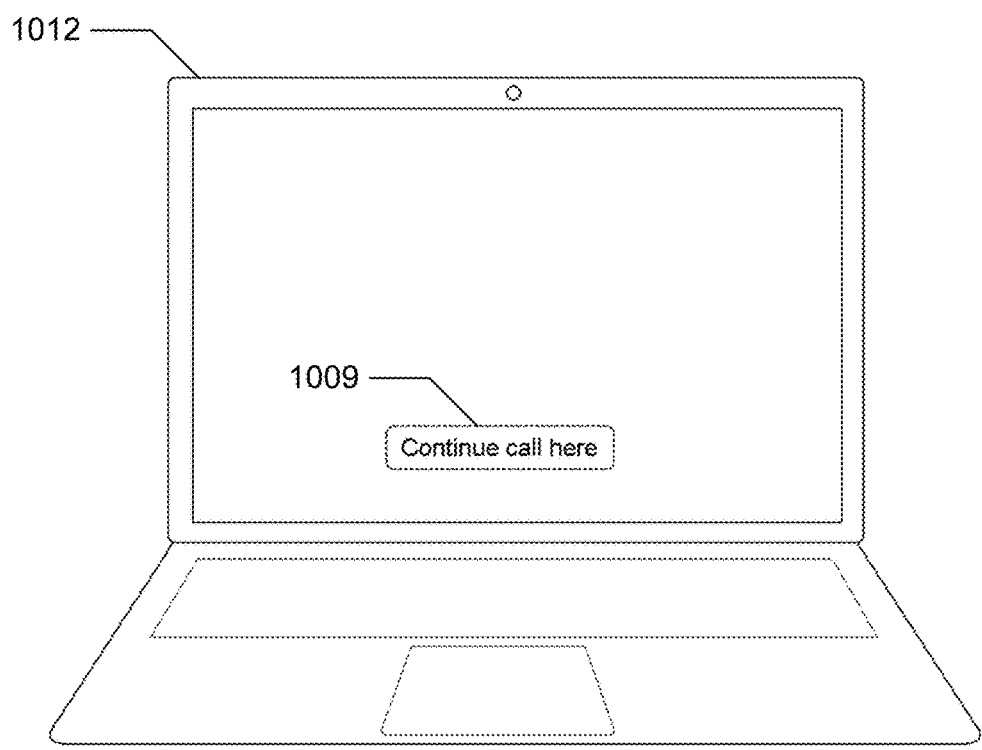

Turning to FIG. 10B, the laptop 1012 is running an application displaying a "Continue call here" button 1009. Selecting the button 1009 will pull the audio content from the mobile device 1002 to the laptop 1012. Furthermore, video content of the group video conference can now be displayed (e.g., synchronized to the audio content) on the laptop 1012.

Figure 10C:
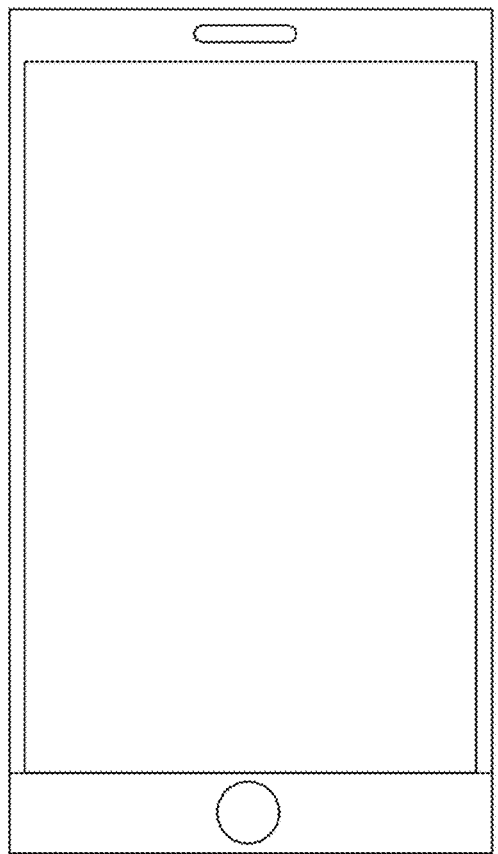

Turning to FIG. 10C, the mobile device 1002 had the call ended by the remote end and is no longer playing audio content. The mobile device 1002 has entered low power (e.g., sleeping) mode after the call had ended.

Figure 10D:
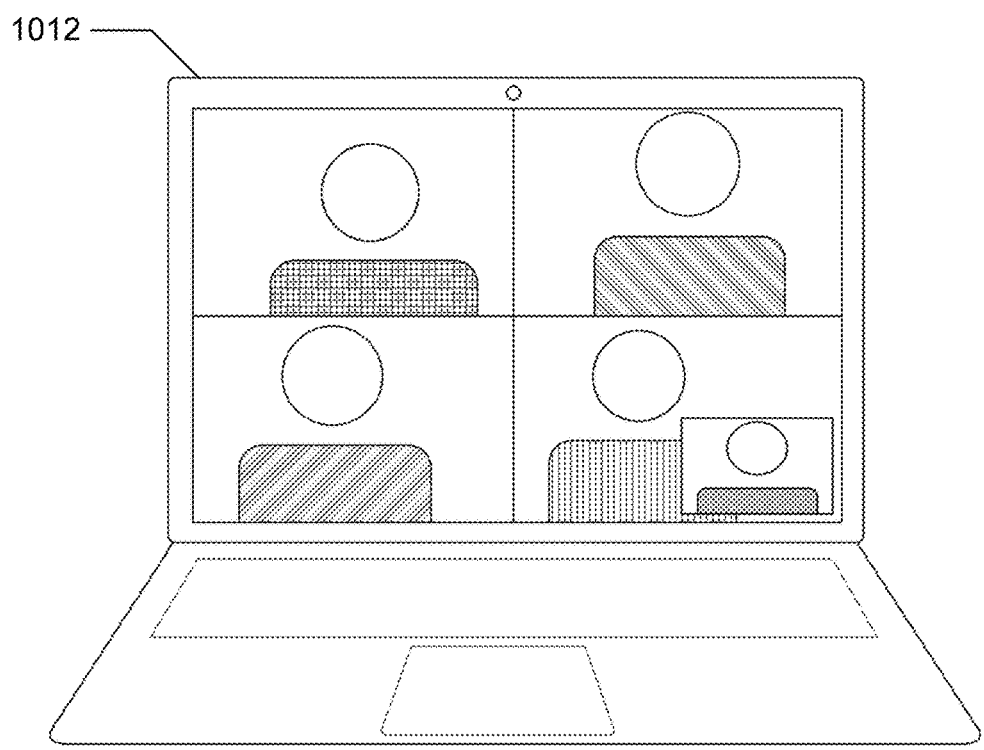

Turning to FIG. 10D, the laptop 1012 displays the video content of the group video conference and it also plays audio content of that video conference (e.g., synchronized to the video content) after it was transferred from the mobile device 1002 (of FIG. 10C).

End of Examples

Although systems and processes have been described with respect to media play and/or calls specifically, one or more of the described components and/or operations may be utilized to facilitate handoff of either media play or calls, as appropriate.

Although users have been described as a human, a user may be a person, a group of people, a person or persons interacting with one or more computers (e.g., any programmable logic device including laptops, TVs, speakers, etc.) and/or a computer system.

Although specific implementations have been described in the Figures, the devices (e.g., user devices, Media Manager, etc.) may be any appropriate computer or other programmable logic device. The devices may include a processor that executes instructions and manipulates data to perform operations of the controller. Processor may include a programmable logic device, a microprocessor, or any other appropriate device for manipulating information in a logical manner. Multiple processors may be used according to particular needs, and reference to processor is meant to include multiple processors where appropriate. The Media Manager may include a server, which may provide content and/or through which content may be made accessible.

A memory of the device may include any appropriate form(s) of volatile and/or nonvolatile memory. Memory may include one or more forms of memory such as volatile memory (e.g., RAM) or nonvolatile memory, such as read-only memory (ROM), optical memory (e.g., CD, DVD, or LD), magnetic memory (e.g., hard disk drives, floppy disk drives), NAND flash memory, NOR flash memory, electrically-erasable, programmable read-only memory (EEPROM), Ferroelectric random-access memory (FeRAM), magnetoresistive random-access memory (MRAM), non-volatile random-access memory (NVRAM), non-volatile static random-access memory (nvSRAM), and/or phase-change memory (PRAM). The memory of a device may include a database. A variety of repositories may be used, such as, SQL databases, relational databases, key value databases, object oriented databases, distributed databases, XML databases, and/or web server repositories. The repositories may be local and/or remote.

In addition, various software (e.g., modules) may be stored on the memory of a device. For example, instructions (e.g., operating systems and/or other types of software), and/or modules, such as modules on the Media Manager, may be stored on a memory of a device (e.g., Media Manager and/or user device). In some implementations, modules may be combined, such as into a single module or multiple modules. Modules may include various modules and/or sub-modules. The modules may include one or more of the operations described in processes. In some implementations, one or more modules (e.g., location on the same or different devices may operate together to perform one or more operations described in the processes). The modules may be executed by a processor on the appropriate device (e.g., first user device, second user devices, Media Manager, etc.).

A communication interface may allow the device(s) to communicate with each other and/or other computer systems (e.g., third party software). The communication interface may transmit data and/or receive data from other components, other repositories, and/or other computer systems via network protocols (e.g., TCP/IP, Bluetooth, NFC, Zigbee, and/or Wi-Fi) and/or a bus (e.g., serial, parallel, USB). Operations of various modules stored in a memory may be updated and/or altered through the communication via network protocols (e.g., remotely through a firmware update and/or by a device directly coupled to the controller).

Although specific components have been described in the Figures, the components may be any appropriate computer or other programmable logic device. For example, first user device, second user device, Media Manager, and/or other components may include any appropriate device, such as a computer or programmable logic device.

The components (e.g., first user device, second user device, Media Manager and/or other components of the systems) may include a processor that executes instructions and manipulates data to perform operations of the component. A processor may include a programmable logic device, a microprocessor, or any other appropriate device for manipulating information in a logical manner and memory may include any appropriate form(s) of volatile and/or nonvolatile memory, such as RAM and/or Flash memory.

The memory may include data, such various criteria to utilize facilitate analysis, restrictions, and/or any other data useful to the operation of system. The memory may store data such as criteria utilized to determine which devices may transfer media to which other devices, timing criteria, state of devices pending handoff, communication protocol, and/or other appropriate data.

In addition, various software (e.g., instructions to allow performance of operations) may be stored on the memory. For example, instructions (e.g., operating systems, modules and/or other types of software) may be stored on a memory of appropriate components (e.g., first user device, second user device, Media Manager, and/or other components of the systems). The module(s) of various components may include instructions to perform one or more of the operations in the described processes.

In some implementations, modules may be combined, such as into a single module or multiple modules. In an implementation, operation modules may include various modules and/or sub-modules.

A communication interface may allow the components to communicate with and/or restrict communications with other components of the system and/or other computer systems. The communication interface may transmit data from the controller and/or receive data from other components, other repositories, and/or other computer systems via network protocols (e.g., TCP/IP, Bluetooth, NFC, Zigbee, and/or Wi-Fi) and/or a bus (e.g., serial, parallel, and/or USB). For example, a communication interface of the first user device may allow the first user device to communicate with other components, such as Content Provider, and/or Media Manager.

The described devices may include a presentation interface to present data to a user, such as though a monitor and speakers. The presentation interface may facilitate receipt of requests for operation from users. For example, a user device may include a presentation interface, such as a touchscreen, on which the media from a Content Provider may be presented to a user.

Although the Figures provide examples of devices that may be used with the disclosure, the various devices (e.g., user device, Media Manager) can be implemented through computers such as servers, as well as a server pool. For example, a computer may include a general-purpose personal computer (PC), a Macintosh, a workstation, a UNIX-based computer, a server computer, smart phone, tablet computer, smart television, speakers, or any other suitable device. According to one implementation, a device, such as a Media Manager, may include a web server. A device may be adapted to execute any operating system including UNIX, Linux, Android, iOS, Windows, or any other suitable operating system. The device may include software and/or hardware in any combination suitable to provide access to data and/or translate data to an appropriate compatible format.

In various implementations, graphical user interface (GUI) may be generated by the management module (e.g., of the AD and/or other modules), Media Manager Application (e.g., elements and/or controls displayed within the application), Content Provider (e.g., as part of the game interface, as an element in embedded player, etc.), and may be displayed on a presentation interface (e.g., a monitor or screen of the first and/or second user device). GUI may be operable to allow the user of a user device to interact with repositories and/or various interface(s). Generally, GUI provides a user with an efficient and user-friendly presentation of data provided by the system. GUI includes a plurality of displays having interactive fields, such as image icons, pull-down lists, fillable fields, and editable text operated by the user. And in one example, GUI presents an explore-type interface and receives commands from the user. It should be understood that the term graphical user interface may be used in the singular or in the plural to describe one or more graphical user interfaces in each of the displays of a particular graphical user interface. Further, GUI contemplates any graphical user interface, such as a generic web browser, that processes information in the system and/or user device and efficiently presents the information to the user. In some implementations, GUI may present a web page embedding content. The server can accept data from a user device(s) via the web browser (e.g., Microsoft Internet Explorer, Safari, Firefox, Microsoft Edge, and/or Google Chrome) and return the appropriate Hyper Text Markup Language (HTML) or eXtensible Markup Language (XML) responses.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable signal(s) may be non-transitory waves and/or non-transitory signals.

It is to be understood the implementations are not limited to particular systems or processes described which may, of course, vary. It is also to be understood that the terminology used herein is for the purpose of describing particular implementations only and is not intended to be limiting. As used in this specification, the singular forms "a", "an" and "the" include plural referents unless the content clearly indicates otherwise. Thus, for example, reference to "content" includes a combination of two or more content items and reference to "content" includes different types and/or combinations of content. For example, content may include video and/or audio portions. As another example, content may include more than one item of content (e.g., streaming media, comments, etc.).

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

In the examples above, the handoff protocols involve passing messages back and forth between the user devices and the Media Manager. The messages may be implemented as JavaScript object notation (JSON) files transferred between the user devices and the Media Manager, either directly (e.g., user device sends JSON file to Media Manager) and/or through an intermediary directly (e.g., user device sends JSON file to the Content Provider, which may augment the JSON file with additional information and then pass the augmented JSON file to the Media Manager on behalf of the user device), or indirectly (e.g., the Content Provider may detect a state change of the device and/or the content being played and send a notification to the Media Manager about the state change). The types of handoff protocols include a push mode handoff protocol where the first device initiates the handoff to push the media to a second device and a pull mode handoff protocol where the second device initiates the handoff to pull the media from a first device. The systems and methods of Example 1 and Example 2 may use a push mode handoff protocol. The systems and methods of Example 3, Example 4, Example 5, Example 6 and Example 7 may use a pull mode handoff protocol.

A push mode handoff protocol may include a request message, a reply message, and a notification message. An example of a request message for a push mode handoff protocol in a pseudo JSON format is listed below. The example JSON files below include comments inside of angle brackets, which would not appear in an actual JSON file. The variables and values in the example JSON files below may be removed or combined with other variables and values.

```
{
    deviceId: <unique device identifier, first user device>,
    mediaParameters: <parameters used to launch media playback>,
    mediaState: <state of the playing media>,
    mediaStateTimestamp: <media state snapshot timestamp>,
    systemState: <state of the device>
}
```

The unique device identifier is an alphanumeric string (e.g., a universally unique identifier (UUID)) that uniquely and persistently identifies a device in the system. Values for the system state, media state, location, and open connections are linked to the unique identifier for a given device using the unique device identifier.

The "parameters used to launch media playback" (also referred to as media launch parameters) include data that the app on a user device may use for setting up the media playback. The parameters may include, but are not limited to, access tokens and application programming interface (API) keys for third party APIs and software development kits (SDKs), private or public uniform resource locators (URLs) or uniform resource identifiers (URIs) to access the media resource, login credentials, as well as identifying information about the media provider.

Different media launch parameters may be used for different media sources. The media launch parameters may identify the media source and include values and variables that are pertinent to the particular source.

An example of a JSON file with media parameters for a media source that provides access to streaming videos is provided below.

```
{
    providerName: "YouTube",
    providerId: "yt_embed",
    containerType: "embed",
    containerOptions: {
        url: "https://www.youtube.com/watch?v=mXj7P9hxN4z",
        allowFullscreen: true,
        loop: false
    }
}
```

An example of a JSON file with media parameters for a media source that provides access to streaming music is provided below.

```
{
    providerName: "Spotify",
    providerId: "spotify_sdk",
    containerType: "sdk",
    containerOptions: {
        sdkId: "spotify_javascript",
        sdkUrl: "https://example.spotify.com/js/sdk.js",
        clientId: "afkpgmczg3rsd767j316",
        clientSecret: "9TcWO1HnxZJ0CBRx8D6w1DszRtn4r0L",
        trackId: "0uRzHhCj7o1YzLlvI1fX0K",
        playlistId: "2v3iNvBX8xy1Gt0uXtKKUT"
    }
}
```

The "state of the playing media" parameters (also referred to as the playing media state parameters) may include several values that identify the state of the media at a given time. The playing media state contains information needed to ensure continuity of playback on another device, including: time offset in media track, playback speed, media volume, subtitle selections, audio track selections, etc.

Different types of media may have different playing media state parameters.

An example of a JSON file with playing media state parameters for audio/music playback on a user device is provided below.

```
{
    tracks: [
        {
            type: "audio",
            volume: 0.9,
            position: 102.8913,
            playbackRate: 1.0,
            id: "default"
        }
    ]
}
```

An example of a JSON file with playing media state parameters for embedded video playback on a user device is provided below.

```
{
    tracks: [
        {
            type: "mixed_av",
            volume: 1.0,
            position: 329.1107,
            playbackRate: 1.25,
            id: "default"
        }
    ]
}
```

An example of a JSON file with playing media state parameters for an HTTP live streaming (HLS) stream playback on a user device is provided below.

```
{
    tracks: [
        {
            type: "audio",
            volume: 0.5,
            position: 12.061,
            playbackRate: 1.0,
            id: "mp3_128k"
        },
        {
            type: "video",
            position: 12.261,
            playbackRate: 1.0,
            id: "h264_1080p"
        }
    ]
}
```

The "media state snapshot timestamp" value may be a Unix timestamp with millisecond resolution. The media state snapshot timestamp value identifies when the media state snapshot was taken.

The "state of the device" parameters (also referred to as the device state parameters) includes information that may be used by the Media Manager to determine a suitable handoff protocol. The device state parameters include available information about the system capabilities, system load, attached devices, location information, as well as system clock information.

Different devices may have different device state parameters. An example of a pseudo JSON file with device state parameters for a user device that is a mobile device is provided below.

```
{
    location: {
        lat: 37.423021,
        lng: -122.083739,
        elv: 11.9,
        acc: 8.2
    },
    hardware: {
        memFree: 200,
        cpuLoad: 0.2
    },
    audioDevices: ["stereo_headphones"],
    inputDevices: ["usb_keyboard"],
```

```
    videoCodecs: ["vp8", "vp9", "h264", "h265"],
    audioCodecs: ["mp3", "opus", "flac"],
    systemTimestamp: <unix timestamp with millisecond (microsecond
    resolution if available)>
    systemTimeOffset: <milliseconds (microseconds if available)
    difference between system time and Media Server time, from point of
    view of the device; mobile devices for which the offset is not
    available may omit this parameter>
}
```

Returning to the push mode handoff protocol, an example of a reply message for a push mode handoff protocol in a pseudo JSON format is listed below. The reply message may be sent in response to the request message.

```
{
    status: "success",
    handoffParameters: <parameters passed to handoff handler>
}
```

The "parameters passed to handoff handler" (also referred to as handoff handler parameters) include information used for setting up the handoff and used by the handoff algorithms. Some pre-programmed handoff algorithms may require no parameters other than the algorithm name and starting time.

Different algorithms may have different handoff handler parameters. An example of a pseudo JSON file with handoff handler parameters for a pre-defined is provided below.

```
{
    algorithm: "fadeOut",
    duration: 300, <if not provided, default algorithm duration [unique to
    each pre-programmed algorithm] is used>
    startTimeLocal: <unix timestamp with millisecond (microsecond
    resolution if available) when the algorithm should be executed (from
    point of view of the device)>
}
```

An example of a pseudo JSON file with handoff handler parameters for a custom algorithm is provided below.

```
{
    algorithm: "custom",
    parameters: [
        {
            targets: {
                "mp3__128k.volume": 0 <target value for given
                parameter ID>
            },
            duration: 300, <time in milliseconds>
            offset: 0, <time in milliseconds>
            easing: "easeInSine" <named curve, parameters stored
            in the app implementing the algorithm>
        },
        {
            targets: {
                "h264__1080p.opacity": 0
            },
            duration: 300,
            offset: 0,
            easing: [0.17, 0.67, 0.83, 0.67] <Bezier curve points>
        },
        {
            targets: {
                "mp3__128k.paused": true,
                "h264__1080p.paused": true
            },
            duration: 0,
```
```
            offset: 300,
            easing: "none"
        }
    ],
    duration: 300,
    startTimeLocal: <unix timestamp with millisecond (microsecond
    resolution if available) when the algorithm should be executed>
}
```

The "easing" methods in the example above are named Bezier curves. E.g., "easeInSine" is just a short name for a cubic Bezier curve with the parameters of [0.47, 0, 0.745, 0.715]. The Bezier curve parameters (or different short names) may be adjusted (or used) to use different easing curves.

A default algorithm may have a default duration attached. The default duration may be overwritten with the handoff handler parameters or the default settings may be changed for a particular device or for a particular user account.

Returning to the push mode handoff protocol, an example of a notification message for a push mode handoff protocol in a pseudo JSON format is listed below. The notification messages for either mode may be sent periodically or in response to changes in the values of the variables for the handoff.

```
{
    mediaParameters: <parameters needed to launch media playback>,
    mediaState: <state of the playing media>,
    mediaStateTimestamp: <media state snapshot timestamp>,
    handoffParameters: <parameters passed to handoff handler>
}
```

A pull mode handoff protocol may include a request message, a reply message, and a notification message. A first example of a request message in a pseudo JSON format is listed below in which the second device initiating the handoff has the media parameters, which are provided in the request message.

```
{
    type: "mediaTakeover",
    deviceId: <unique device identifier, second user device>,
    requestFromDeviceId: <unique device identifier, first user device>,
    mediaParameters: <last known parameters needed to launch media
    playback>
}
```

A second example of a request message in a pseudo JSON format is listed below in which the second device initiating the handoff does not have the media parameters. In some implementations, the second device may not have the first user device identifier.

```
{
    type: "mediaRequest",
    deviceId: <unique device identifier, second user device>,
    requestFromDeviceId: <unique device identifier, first user device
    (optional)>
}
```

An example of a reply message for a pull mode handoff protocol in a pseudo JSON format is listed below. The message below may be sent from the server to the second device that is pulling the media from the first device.

```
{
    status: "success",
    mediaParameters: <parameters needed to launch media playback>,
    mediaState: <state of the playing media>,
    mediaStateTimestamp: <media state snapshot timestamp>,
    handoffParameters: <parameters passed to handoff handler>
}
```

In some implementations, the reply message may be sent to the Content Provider instead of to the user device that requested the handoff. For example, the user device requesting the handoff may request the handoff by dialing into the Content Provider to join a conference call managed by the Content Provider. The Content Provider may receive commands from the media manager that control the handoff. As an example, the commands in the reply message may include an "action" command with a corresponding value that indicates how the handoff request should be handled by the Content provider. Below is an example of in a pseudo JSON format for the command to reject a call.
{action: "reject"}
Below is an example of in a pseudo JSON format for the command to accept a call.
{action: "accept"}
Below is an example of in a pseudo JSON format for the command to join a conference call.

```
{
    action: "joinConference",
    conferenceId: <conference identifier where device will receive audio content from>
}
```

An example of a notification message for a pull mode handoff protocol in a pseudo JSON format is listed below. The message below may be sent from the server to the first device from which the media is being pulled.

```
{
    handoffParameters: <parameters passed to handoff handler>
}
```

The system may also use state discovery messages and media state discovery messages. The system state discovery messages share the state of the system with the components of the system and the media state discovery messages share the state of the media with the components of the system.

An example of a system state request message in a pseudo JSON format is listed below. The system state request below may be sent from the server (i.e., the Media Manager) to the user device.

```
{
    requesting: "systemState"
}
```

An example of a system state response message in a pseudo JSON format is listed below. The system state request below may be sent from the user device to the server.

```
{
    type: "systemState",
    deviceId: <unique device identifier, first user device>,
    systemState: <state of the device>,
    stateTimestamp: <state snapshot timestamp>
}
```

An example of a media state request message in a pseudo JSON format is listed below. The media state request below may be sent from the server to the user device.

```
{
    requesting: "mediaState"
}
```

An example of a media state response message in a pseudo JSON format is listed below. The media state request below may be sent from the user device to the server.

```
{
    type: "mediaState",
    deviceId: <unique device identifier, first user device>,
    mediaState: <state of the playing media>,
    mediaStateTimestamp: <media state snapshot timestamp>
}
```

Figure 11A:
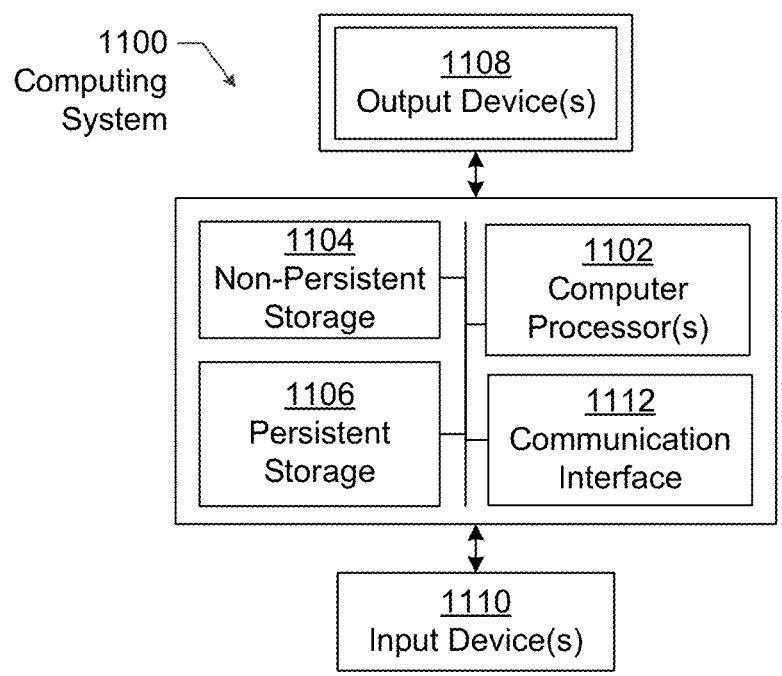
FIG. 11A and FIG. 11B show computing systems in accordance with disclosed embodiments.

Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 11A, the computing system 1100 may include one or more computer processors 1102, non-persistent storage 1104 (e.g., volatile memory, such as random access memory (RAM), cache memory), persistent storage 1106 (e.g., a hard disk, an optical drive such as a compact disk (CD) drive or digital versatile disk (DVD) drive, a flash memory, etc.), a communication interface 1112 (e.g., Bluetooth interface, infrared interface, network interface, optical interface, etc.), and numerous other elements and functionalities that implement the features and elements of the disclosure.

The computer processor(s) 1102 may be an integrated circuit for processing instructions. For example, the computer processor(s) may be one or more cores or micro-cores of a processor. The computing system 1100 may also include one or more input devices 1110, such as a touchscreen, keyboard, mouse, microphone, touchpad, electronic pen, or any other type of input device.

The communication interface 1112 may include an integrated circuit for connecting the computing system 1100 to a network (not shown) (e.g., a local area network (LAN), a wide area network (WAN) such as the Internet, mobile network, or any other type of network) and/or to another device, such as another computing device.

Further, the computing system 1100 may include one or more output devices 1108, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 1102, non-persistent storage 1104, and persistent storage 1106. Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 11B:
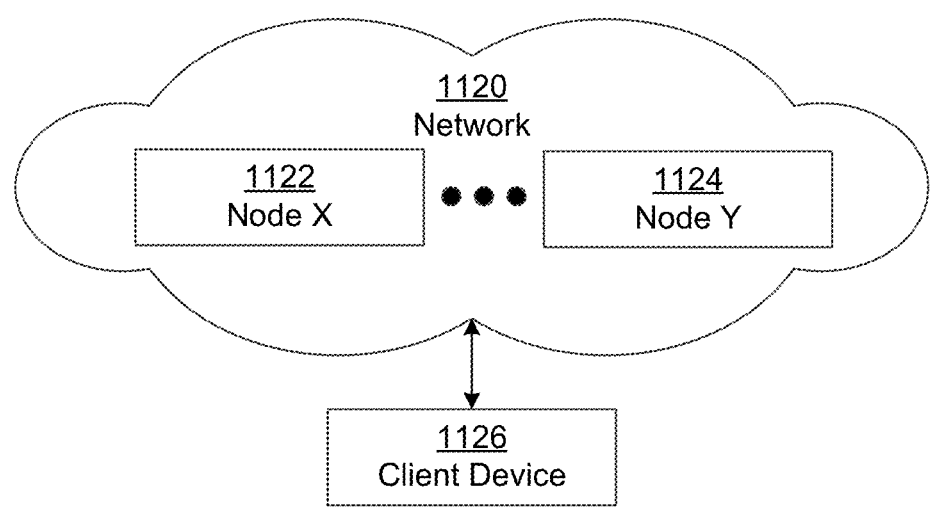

The computing system 1100 in FIG. 11A may be connected to or be a part of a network. For example, as shown in FIG. 11B, the network 1120 may include multiple nodes (e.g., node X 1122, node Y 1124). Each node may correspond to a computing system, such as the computing system shown in FIG. 11A, or a group of nodes combined may correspond to the computing system shown in FIG. 11A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system 1100 may be located at a remote location and connected to the other elements over a network.

Although not shown in FIG. 11B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X 1122, node Y 1124) in the network 1120 may be configured to provide services for a client device 1126. For example, the nodes may be part of a cloud computing system. The nodes may include functionality to receive requests from the client device 1126 and transmit responses to the client device 1126. The client device 1126 may be a computing system, such as the computing system shown in FIG. 11A. Further, the client device 1126 may include and/or perform all or a portion of one or more embodiments of the invention.

The computing system or group of computing systems described in FIG. 11A and FIG. 11B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 11A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 11A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 11A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (database, table, record, column, view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 11A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 11A and the nodes and/or client device in FIG. 11B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
receiving, by a server, a request message for a handoff of content from a first device displaying the content to a second device;
generating a handoff protocol for the handoff in response to the handoff request message; and
transmitting, to one of the first device and the second device, a first notification message that includes a plurality of handoff parameters, based on the handoff protocol, that identifies an algorithm for the handoff of the content, wherein the content is displayed with the second device after the handoff is complete.

2. The method of claim 1, further comprising:
receiving the request message from the first device;
generating the handoff protocol as a push mode handoff protocol; and
transmitting a reply message to the second device.

3. The method of claim 1, further comprising:
receiving the request message from the first device with an offset for the content.

4. The method of claim 1, further comprising:
receiving the request message from the second device;
generating the handoff protocol as a pull mode handoff protocol; and
transmitting a reply message to the first device.

5. The method of claim 1, further comprising:
transmitting a reply message to the first device with an offset for the content.

6. The method of claim 1, wherein the content comprises one or more of video content, audio content, and gaming content.

7. The method of claim 1, further comprising:
receiving the request message from the second device with a set of media parameters to launch the content.

8. A system comprising:
a processor;
a memory coupled to the processor;
the memory comprising an application, wherein the application executes on the processor, uses the memory, and is configured for:
receiving, by a server, a request message for a handoff of content from a first device displaying the content to a second device;
generating a handoff protocol for the handoff in response to the handoff request message; and
transmitting, to one of the first device and the second device, a first notification message that includes a plurality of handoff parameters, based on the handoff protocol, that identifies an algorithm for the handoff of the content, wherein the content is displayed with the second device after the handoff is complete.

9. The system of claim 8, wherein the application is further configured for:
receiving the request message from the first device;
generating the handoff protocol as a push mode handoff protocol; and
transmitting a reply message to the second device.

10. The system of claim 8, wherein the application is further configured for:
receiving the request message from the first device with an offset for the content.

11. The system of claim 8, wherein the application is further configured for:
receiving the request message from the second device;
generating the handoff protocol as a pull mode handoff protocol; and
transmitting a reply message to the first device.

12. The system of claim 8, wherein the application is further configured for:
transmitting a reply message to the first device with an offset for the content.

13. The system of claim 8, wherein the content comprises one or more of video content, audio content, and gaming content.

14. The system of claim 8, wherein the application is further configured for:
receiving the request message from the second device with a set of media parameters to launch the content.

15. A set of one or more non-transitory computer readable mediums comprising computer readable program code for:
receiving, by a server, a request message for a handoff of content from a first device displaying the content to a second device;
generating a handoff protocol for the handoff in response to the handoff request message; and
transmitting, to one of the first device and the second device, a first notification message that includes a plurality of handoff parameters, based on the handoff protocol, that identifies an algorithm for the handoff of the content, wherein the content is displayed with the second device after the handoff is complete.

16. The set of one or more non-transitory computer readable mediums of claim 15, further comprising computer readable program code for:
receiving the request message from the first device;
generating the handoff protocol as a push mode handoff protocol; and
transmitting a reply message to the second device.

17. The set of one or more non-transitory computer readable mediums of claim 15, further comprising computer readable program code for:

receiving the request message from the first device with an offset for the content.

18. The set of one or more non-transitory computer readable mediums of claim 15, further comprising computer readable program code for:
   receiving the request message from the second device;
   generating the handoff protocol as a pull mode handoff protocol; and
   transmitting a reply message to the first device.

19. The set of one or more non-transitory computer readable mediums of claim 15, further comprising computer readable program code for:
   transmitting a reply message to the first device with an offset for the content.

20. The set of one or more non-transitory computer readable mediums of claim 15, wherein the content comprises one or more of video content, audio content, and gaming content.

\* \* \* \* \*